(12) United States Patent
Takagi et al.

(10) Patent No.: US 11,718,810 B2
(45) Date of Patent: *Aug. 8, 2023

(54) LUBRICATING OIL COMPOSITION AND METHOD FOR DEFOAMING LUBRICATING OIL, AND DEFOAMING AGENT COMPOSITION

(71) Applicant: ENEOS CORPORATION, Tokyo (JP)

(72) Inventors: Akira Takagi, Tokyo (JP); Go Tatsumi, Tokyo (JP); Noriko Ayame, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 50 days.

This patent is subject to a terminal disclaimer.

(21) Appl. No.: 17/602,113

(22) PCT Filed: Apr. 10, 2020

(86) PCT No.: PCT/JP2020/016159
§ 371 (c)(1),
(2) Date: Oct. 7, 2021

(87) PCT Pub. No.: WO2020/209370
PCT Pub. Date: Oct. 15, 2020

(65) Prior Publication Data
US 2022/0204884 A1 Jun. 30, 2022

(30) Foreign Application Priority Data

Apr. 12, 2019 (JP) .................... 2019-076600

(51) Int. Cl.
*C10M 155/02* (2006.01)
*B01D 19/04* (2006.01)
(Continued)

(52) U.S. Cl.
CPC ....... *C10M 155/02* (2013.01); *B01D 19/0409* (2013.01); *B01D 19/0427* (2013.01);
(Continued)

(58) Field of Classification Search
CPC .............. C10M 155/02; C10M 101/02; C10M 105/32; C10M 2203/1006;
(Continued)

(56) References Cited

U.S. PATENT DOCUMENTS 4,906,403 A * 3/1990 Berger ................. C08G 77/442
516/123
5,766,513 A * 6/1998 Pillon ................ C10M 171/004
252/78.3
(Continued)

FOREIGN PATENT DOCUMENTS

| CN | 107922872 A | 4/2018 |
| JP | 2000-087065 | 3/2000 |

(Continued)

OTHER PUBLICATIONS

ISR issued in WIPO Patent Application No. PCT/JP2020/016159, dated Jul. 14, 2020, English translation.

*Primary Examiner* — Ellen M McAvoy
(74) *Attorney, Agent, or Firm* — Greenblum & Bernstein, P.L.C.

(57) ABSTRACT

A lubricating oil composition including: a lubricating base oil; (A) a first defoaming agent, the first defoaming agent being (A1) a first polymer, or (A2) a second polymer, or any combination thereof; and (B) a second defoaming agent, the second defoaming agent being a silicone defoaming agent, the (A1) first polymer including: a first polymer chain including a polysiloxane structure, the polysiloxane structure having a polymerization degree of 5 to 2000 and being (Continued)

represented by the following general formula (1); and a second polymer chain bonded with the first polymer chain, the second polymer chain including a repeating unit represented by the following general formula (2), the (A2) second polymer being a copolymer of a first monomer component and a second monomer component, the first monomer component represented by the general formula (7) or (8), the second monomer component represented by the general formula (9).

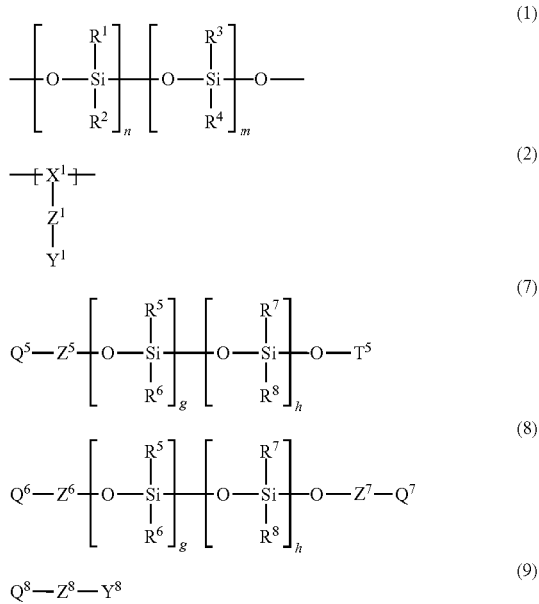

24 Claims, 1 Drawing Sheet

(51) Int. Cl.

| | | |
|---|---|---|
| C10M 101/02 | (2006.01) | |
| C10M 105/32 | (2006.01) | |
| C10M 111/02 | (2006.01) | |
| C10M 169/04 | (2006.01) | |
| C10M 177/00 | (2006.01) | |
| C10N 70/00 | (2006.01) | |
| C10N 40/04 | (2006.01) | |
| C10N 20/04 | (2006.01) | |
| C10N 30/02 | (2006.01) | |
| C10N 30/18 | (2006.01) | |
| C10N 40/25 | (2006.01) | |

(52) U.S. Cl.
CPC ........ *C10M 101/02* (2013.01); *C10M 105/32* (2013.01); *C10M 111/02* (2013.01); *C10M 169/041* (2013.01); *C10M 177/00* (2013.01); C10M 2203/1006 (2013.01); C10M 2207/2805 (2013.01); C10M 2229/041 (2013.01); C10M 2229/051 (2013.01); C10N 2020/04 (2013.01); C10N 2030/02 (2013.01); C10N 2030/18 (2013.01); C10N 2040/042 (2020.05); C10N 2040/25 (2013.01); C10N 2070/02 (2020.05)

(58) Field of Classification Search
CPC .... C10M 2207/2805; C10M 2229/041; C10M 2229/051; B01D 19/0409; B01D 19/0427; B01D 19/0005; B01D 19/02; C10N 2020/04; C10N 2030/02; C10N 2030/18; C10N 2070/02
See application file for complete search history.

(56) References Cited

U.S. PATENT DOCUMENTS

| | | | |
|---|---|---|---|
| 8,524,849 B2* | 9/2013 | Stark | C08G 77/38 524/588 |
| 2009/0116808 A1* | 5/2009 | Kyota | C08F 218/04 525/100 |
| 2011/0287206 A1* | 11/2011 | Suwa | C08L 33/08 428/220 |
| 2013/0244917 A1* | 9/2013 | Obrecht | C10M 107/24 508/579 |
| 2014/0018267 A1* | 1/2014 | Loop | C10M 169/048 508/206 |
| 2018/0208870 A1 | 7/2018 | Takagi et al. | |
| 2018/0208871 A1 | 7/2018 | Takagi et al. | |
| 2018/0223219 A1 | 8/2018 | Takagi et al. | |
| 2019/0256790 A1 | 4/2019 | Takagi et al. | |
| 2019/0390132 A1 | 12/2019 | Tatsumi et al. | |

FOREIGN PATENT DOCUMENTS

| | | |
|---|---|---|
| JP | 2008-120889 | 5/2008 |
| WO | 2017/030201 | 2/2017 |
| WO | 2017/030202 | 2/2017 |
| WO | 2017/030203 | 2/2017 |
| WO | 2017/030204 | 2/2017 |
| WO | 2018/155579 | 8/2018 |

* cited by examiner

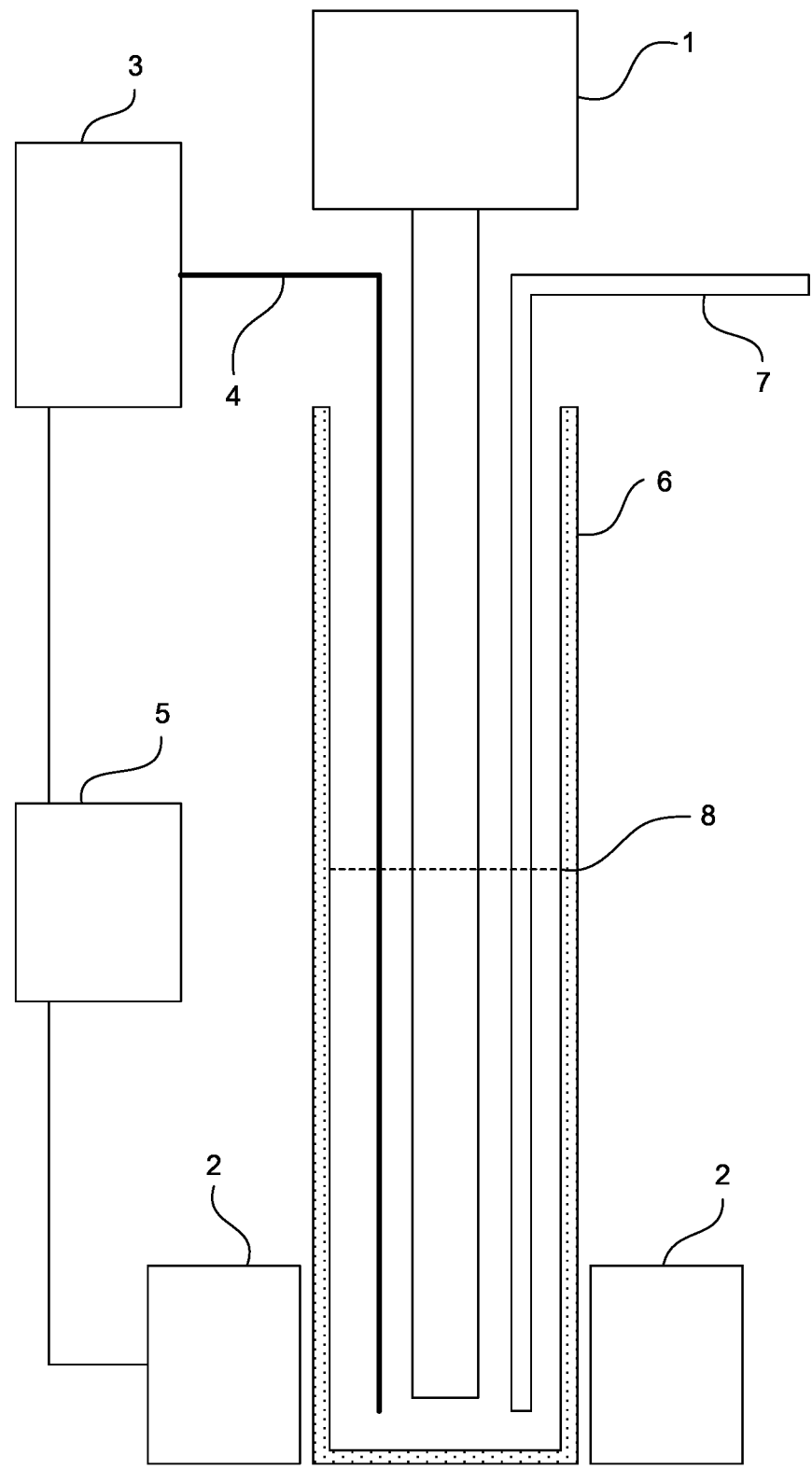

LUBRICATING OIL COMPOSITION AND METHOD FOR DEFOAMING LUBRICATING OIL, AND DEFOAMING AGENT COMPOSITION

FIELD

The present invention relates to a lubricating oil composition and a method for defoaming a lubricating oil, and a defoaming agent composition.

BACKGROUND

Lubricating oil is used in various kinds of machinery in order to improve lubricity between members. Increase of foaming of lubricating oil may lead to insufficient lubrication, failure to control hydraulic pressure, deteriorated cooling efficiency, and so on. Thus, lubricating oil is required to suppress foaming.

Lubricating oil is being exposed to severer environments in, for example, automobile engines, transmissions, and axle units, accompanying their recent improvements in performance and fuel efficiency. Continuous high-load operation or high-speed driving increases foaming in engine oil, transmission oil, or axle unit oil, and as a result, leads to problems such as: failure to control hydraulic pressure due to incorporation of foam in hydraulic circuits; deteriorated lubricating performance or cooling efficiency due to foaming; wear and seizure due to breakage of oil films in friction portions; and promoted deterioration of lubricating oil due to oil temperature increase. Thus, there is the demand for engine oil, transmission oil, and axle unit oil which can maintain high defoaming performance so as to suppress foaming for a long time from the initial stage of use.

Generally, a lubricating oil contains a base oil, and various additives incorporated according to desired characteristics. Examples of additives include deforming agents to prevent foaming of the lubricating oil. Polysiloxane defoaming agents (silicone defoaming agents) are conventionally known as defoaming agents. For example, Patent Literature 1 describes a lubricating oil composition formed by incorporating (a) polydimethylsiloxane having a kinematic viscosity at 25° C. of 300,000 to 1,500,000 mm$^2$/s, and (b) fluorinated polysiloxane having a kinematic viscosity at 25° C. of 500 to 9,000 mm$^2$/s. Patent Literature 2 describes incorporating polydimethylsiloxane having a specific molecular weight distribution into lubricating oil to obtain defoaming effect on foam generated due to high-speed stirring.

CITATION LIST

Patent Literature

Patent Literature 1: JP 2000-87065 A
Patent Literature 2: JP 2008-120889 A
Patent Literature 3: WO 2017/030201 A1
Patent Literature 4: WO 2017/030202 A1
Patent Literature 5: WO 2017/030203 A1
Patent Literature 6: WO 2017/030204 A1
Patent Literature 7: WO 2018/155579 A1

SUMMARY

Technical Problem

Generally, a defoaming agent exhibits defoaming performance by being used while being finely dispersed in a lubricating oil composition. However, a conventional lubricating oil containing a silicone defoaming agent compound is likely to suffer precipitation and unevenness of a silicone defoaming agent in concentration during long-term storage in a bottle or long-term use in machinery, which leads to gradual loss of defoaming effect in course of time to increase foaming of the lubricating oil, which is problematic. For example, a torque converter included in an automatic transmission, a pulley included in a metal belt-type continuously variable transmission, etc. have positions where very large centrifugal effect occurs. When the lubricating oil is supplied to such a position, the silicone defoaming agent compound used as a defoaming agent is separated by such centrifugal effect, and concentrates in a specific position of the machinery, which leads to decreased concentration of the defoaming agent in the lubricating oil circulating in the machinery, and thus to increased foaming of the lubricating oil.

Disadvantageously, the conventional lubricating oil containing a silicone defoaming agent compound also suffers deteriorated defoaming performance in course of time of use when high-load operation or high-speed driving continues. For example, lubricating oil is subjected to high shear stress on lubrication positions inside an engine, an automatic transmission, an axle unit, etc. (such as a sliding part between a piston and a cylinder, a valve train, a high-speed rotation bearing, a belt-pulley, and a gear). Molecules of the silicone defoaming agent compound incorporated in the lubricating oil as a defoaming agent are cut due to high shear stress, which results in decrease of its molecular weight. As a result, defoaming performance of the lubricating oil deteriorates in the endurance stage, which may lead to failure to maintain sufficient defoaming performance for a long term.

A first object of the present invention is to provide a lubricating oil composition which can suppress deterioration of defoaming performance even during long-term storage, and can maintain deforming effect of lubricating oil for a long term even under such lubricating conditions that the lubricating oil is subjected to high centrifugal effect and high shear stress.

A second object of the present invention is to provide a method for defoaming a lubricating oil which is capable of effectively suppress deterioration of defoaming effect due to segregation, precipitation and shearing of a defoaming agent.

The present invention also provides a defoaming agent composition that may be preferably used for preparation of the above described lubricating oil composition, and in the above described method for defoaming a lubricating oil.

Solution to Problem

The present invention encompasses the following aspects [1] to [24].

[1] A lubricating oil composition comprising:
  a lubricating base oil;
  (A) a first defoaming agent, the first defoaming agent being (A1) a first polymer, or (A2) a second polymer, or any combination thereof; and
  (B) a second defoaming agent, the second defoaming agent being a silicone defoaming agent,
  the (A1) first polymer comprising:
  at least one first polymer chain comprising a polysiloxane structure, the polysiloxane structure having a polymerization degree of 5 to 2000 and being represented by the following general formula (1); and at least one second polymer chain bonded with the first polymer chain, the second polymer chain comprising a repeating unit represented by the following general formula (2), the (A2) second polymer being a copolymer of a first monomer component and a second monomer component, the first monomer component being at least one polysiloxane macromonomer selected from compounds represented by the following general formula (7) or (8), the second monomer component being at least one monomer represented by the following general formula (9):

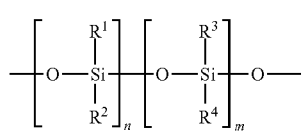

(1)

wherein in the general formula (1), polysiloxane repeating units may be in any order; $R^1$ and $R^2$ are each independently a C1-18 organic group comprising no fluorine atom; $R^3$ and $R^4$ are each independently an organic group comprising at least three fluorine atoms, or a C1-18 organic group comprising no fluorine atom, wherein at least one of $R^3$ and $R^4$ is the organic group comprising at least three fluorine atoms; n is an integer of 0 or more; m is an integer of 1 or more; and n+m is 5 to 2000;

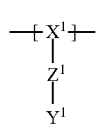

(2)

wherein in the general formula (2), $X^1$ is a repeating unit obtainable by polymerization of an ethylenically unsaturated group; $Y^1$ is a side chain consisting of a substituted or unsubstituted C1-40 hydrocarbyl group; and $Z^1$ is a linking group linking the repeating unit $X^1$ and the side chain $Y^1$;

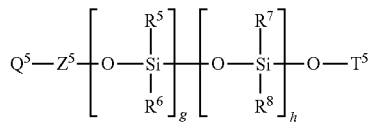

(7)

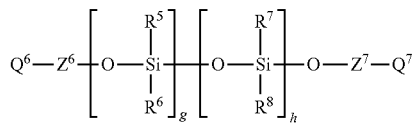

(8)

wherein in the general formulae (7) and (8), polysiloxane repeating units may be in any order; $R^5$ and $R^6$ are each independently a C1-18 organic group comprising no fluorine atom; $R^7$ and $R^8$ are each independently an organic group comprising at least three fluorine atoms, or a C1-18 organic group comprising no fluorine atom, wherein at least one of $R^7$ and $R^8$ is the organic group comprising at least three fluorine atoms; $Q^5$, $Q^6$, and $Q^7$ are each independently a polymerizable functional group comprising an ethylenically unsaturated group; $Z^5$ is a linking group linking the polym- erizable functional group $Q^5$ and the polysiloxane moiety; $Z^6$ is a linking group linking the polymerizable functional group $Q^6$ and the polysiloxane moiety; $Z^7$ is a linking group linking the polymerizable functional group $Q^7$ and the polysiloxane moiety; $T^5$ is a non-polymerizable organic group; g is an integer of 0 or more; h is an integer of 1 or more; and g+h is 5 to 2000; and

(9)

wherein in the general formula (9), $Q^8$ is a polymerizable functional group comprising an ethylenically unsaturated group; $Y^8$ is a substituted or unsubstituted C1-40 hydrocarbyl group; and $Z^8$ is a linking group linking $Q^8$ and $Y^8$.

[2] The lubricating oil composition according to [1], the (A) first defoaming agent comprising the (A1) first polymer,
wherein $X^1$ is a repeating unit obtainable by polymerization of a (meth)acryloyl group.

[3] The lubricating oil composition according to [1] or [2], the (A) first defoaming agent comprising the (A1) first polymer,
wherein in the (A1) first polymer, the at least one second polymer chain is bonded with one terminal or both terminals of the first polymer chain.

[4] The lubricating oil composition according to any one of [1] to [3],
the (A) first defoaming agent comprising the (A1) first polymer,
wherein the first polymer chain is represented by any one of the following general formulae (3) to (6):

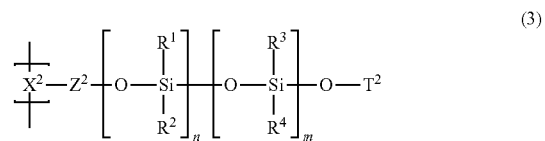

(3)

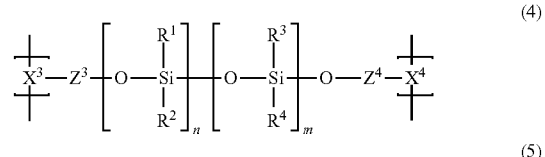

(4)

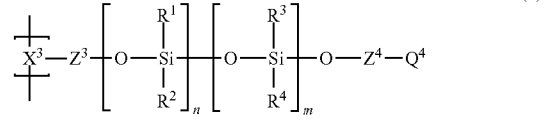

(5)

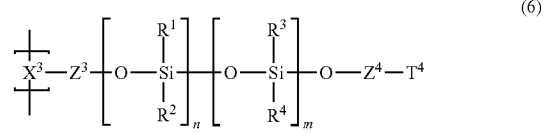

(6)

wherein in the general formulae (3) to (6), polysiloxane repeating units may be in any order; $R^1$, $R^2$, $R^3$, $R^4$, n and m are as previously defined; $X^2$, $X^3$, and $X^4$ are each independently a repeating unit obtainable by polymerization of an ethylenically unsaturated group; $T^2$ is a non-polymerizable organic group; $Q^4$ is a polymerizable functional group giving the repeating unit $X^4$ upon polymerization; $T^4$ is an organic group derived from the polymerizable functional group $Q^4$ by a reaction other than polymer chain elongation; $Z^2$ is a linking group linking the repeating unit $X^2$ and the polysiloxane moiety; $Z^3$ is a linking group linking the repeating unit $X^3$ and the polysiloxane moiety; and $Z^4$ is a linking group linking the repeating unit $X^4$, the polymerizable functional group $Q^4$, or the organic group $T^4$ with the polysiloxane moiety.

[5] The lubricating oil composition according to [4],
wherein $X^2$, $X^3$, and $X^4$ are repeating units obtainable by polymerization of a (meth)acryloyl group.

[6] The lubricating oil composition according to any one of [1] to [5],
the (A) first defoaming agent comprising the (A1) first polymer,
wherein in the (A1) first polymer, the at least one second polymer chain is bonded with only one terminal of the first polymer chain.

[7] The lubricating oil composition according to any of [1] to [5],
the (A) first defoaming agent comprising the (A1) first polymer,
wherein in the (A1) first polymer, the at least one second polymer chain is bonded with both terminals of at least one of the first polymer chain.

[8] The lubricating oil composition according to any one of [1] to [7],
the (A) first defoaming agent comprising the (A1) first polymer,
wherein in the (A1) first polymer, a ratio of a total number of fluorine atom-containing polysiloxane repeating units to a total number of all polysiloxane repeating units is 0.01 to 1.

[9] The lubricating oil composition according to any one of [1] to [8],
the (A) first defoaming agent comprising the (A1) first polymer,
wherein the (A1) first polymer comprises the first polymer chain in an amount of 0.5 to 80 mass % on the basis of the total mass of the (A1) first polymer.

[10] The lubricating oil composition according to any one of [1] to [9],
the (A) first defoaming agent comprising the (A1) first polymer,
wherein the (A1) first polymer has a weight average molecular weight of 10,000 to 1,000,000.

[11] The lubricating oil composition according to any one of [1] to [10],
the (A) first defoaming agent comprising the (A1) first polymer,
wherein the first polymer chain has a weight average molecular weight of 500 to 500,000.

[12] The lubricating oil composition according to any one of [1] to [11],
the (A) first defoaming agent comprising the (A2) second polymer,
wherein in the first monomer component, a ratio of a total number of fluorine atom-containing polysiloxane repeating units to a total number of all polysiloxane repeating units is 0.01 to 1.

[13] The lubricating oil composition according to any one of [1] to [12],
the (A) first defoaming agent comprising the (A2) second polymer,
wherein the (A2) second polymer comprises repeating units derived from the first monomer component in an amount of 0.5 to 80 mass % on the basis of the total mass of the (A2) second polymer.

[14] The lubricating oil composition according to any one of [1] to [13],
the (A) first defoaming agent comprising the (A2) second polymer,
wherein $Q^5$, $Q^6$, and $Q^7$ comprise a (meth)acryloyl group.

[15] The lubricating oil composition according to any one of [1] to [14],
the (A) first defoaming agent comprising the (A2) second polymer,
wherein the (A2) second polymer has a weight average molecular weight of 10,000 to 1,000,000.

[16] The lubricating oil composition according to any one of [1] to [15],
the (A) first defoaming agent comprising the (A2) second polymer,
wherein the first monomer component has a weight average molecular weight of 500 to 500,000.

[17] The lubricating oil composition according to any one of [1] to [16],
wherein the (B) second defoaming agent is a fluorosilicone defoaming agent.

[18] The lubricating oil composition according to any one of [1] to [17],
wherein a ratio (A/B) of an amount of the (A) first defoaming agent in terms of silicon to an amount of the (B) second defoaming agent in terms of silicon is 0.01 to 100.

[19] The lubricating oil composition according to any one of [1] to [18],
wherein a total amount of the (A) first defoaming agent and the (B) second defoaming agent is 0.2 to 300 mass ppm in terms of silicon on the basis of the total mass of the composition.

[20] The lubricating oil composition according to any one of [1] to [19],
wherein the composition has a kinematic viscosity at 100° C. of no more than 4.5 mm$^2$/s.

[21] A method for defoaming a lubricating oil, the method comprising:
(i) dissolving or finely dispersing (A) a first defoaming agent and (B) a second defoaming agent into a diluting solvent, to obtain a dilution such that a total concentration of the (A) first defoaming agent and the (B) second defoaming agent in the dilution is 100 to 50,000 mass ppm in terms of silicon; and
(ii) adding the dilution obtained in the (i) into a lubricating oil,
wherein the (A) first defoaming agent is (A1) a first polymer, or (A2) a second polymer, or any combination thereof;
the (A1) first polymer comprises:
at least one first polymer chain comprising a polysiloxane structure, wherein the polysiloxane structure has a polymerization degree of 5 to 2000 and is represented by the following general formula (1); and
at least one second polymer chain bonded with the first polymer chain, wherein the second polymer chain comprises a repeating unit represented by the following general formula (2);
the (A2) second polymer is a copolymer of a first monomer component and a second monomer component, wherein the first monomer component is at least one polysiloxane macromonomer selected from compounds represented by the following general formula (7) or (8), and wherein the second monomer component is at least one monomer represented by the following general formula (9); and the (B) second defoaming agent is a silicone defoaming agent:

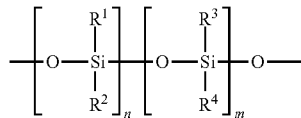 (1)

wherein in the general formula (1), polysiloxane repeating units may be in any order; $R^1$ and $R^2$ are each independently a C1-18 organic group comprising no fluorine atom; $R^3$ and $R^4$ are each independently an organic group comprising at least three fluorine atoms, or a C1-18 organic group comprising no fluorine atom, wherein at least one of $R^3$ and $R^4$ is the organic group comprising at least three fluorine atoms; n is an integer of 0 or more; m is an integer of 1 or more; and n+m is 5 to 2000;

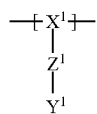 (2)

wherein in the general formula (2), $X^1$ is a repeating unit obtainable by polymerization of an ethylenically unsaturated group; $Y^1$ is a side chain consisting of a substituted or unsubstituted C1-40 hydrocarbyl group; $Z^1$ is a linking group linking the repeating unit $X^1$ and the side chain $Y^1$;

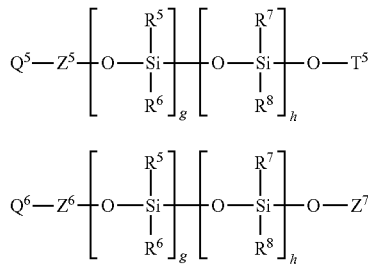 (7)

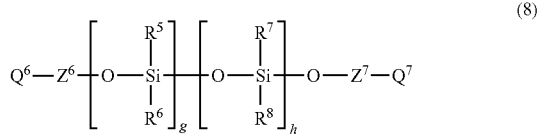 (8)

wherein in the general formulae (7) and (8), polysiloxane repeating units may be in any order; $R^5$ and $R^6$ are each independently a C1-18 organic group comprising no fluorine atom; $R^7$ and $R^8$ are each independently an organic group comprising at least three fluorine atoms, or a C1-18 organic group comprising no fluorine atom, wherein at least one of $R^7$ and $R^8$ is the organic group comprising at least three fluorine atoms; $Q^5$, $Q^6$, and $Q^7$ are each independently a polymerizable functional group comprising an ethylenically unsaturated group; $Z^5$ is a linking group linking the polymerizable functional group $Q^5$ and the polysiloxane moiety; $Z^6$ is a linking group linking the polymerizable functional group $Q^6$ and the polysiloxane moiety; $Z^7$ is a linking group linking the polymerizable functional group $Q^7$ and the polysiloxane moiety; $T^5$ is a non-polymerizable organic group; g is an integer of 0 or more; h is an integer of 1 or more; and g+h is 5 to 2000; and

 (9)

wherein in the general formula (9), $Q^8$ is a polymerizable functional group comprising an ethylenically unsaturated group; $Y^8$ is a substituted or unsubstituted C1-40 hydrocarbyl group; and $Z^8$ is a linking group linking $Q^8$ and $Y^8$.

[22] The method for defoaming the lubricating oil according to [21],
wherein the diluting solvent comprises at least one solvent selected from the group consisting of: hydrocarbon solvents having at least 6 carbons, mineral oils, synthetic oils, ester oils, aliphatic ethers having at least 4 carbons, esters of aliphatic monocarboxylic acids having at least 2 carbons and C1-5 monoalcohols, aliphatic ketones having at least 3 carbons, aliphatic alcohols having at least 4 carbons, and halogenated hydrocarbons.

[23] A defoaming agent composition comprising:
(A) a first defoaming agent, the first defoaming agent being (A1) a first polymer, or (A2) a second polymer, or any combination thereof; and
(B) a second defoaming agent being a silicone defoaming agent,
the (A1) first polymer comprising:
at least one first polymer chain comprising a polysiloxane structure, the polysiloxane structure having a polymerization degree of 5 to 2000 and being represented by the following general formula (1); and
at least one second polymer chain bonded with the first polymer chain, the second polymer chain comprising a repeating unit represented by the following general formula (2),
the (A2) second polymer being a copolymer of a first monomer component and a second monomer component, the first monomer component being at least one polysiloxane macromonomer selected from compounds represented by the following general formula (7) or (8), the second monomer component being at least one monomer represented by the following general formula (9):

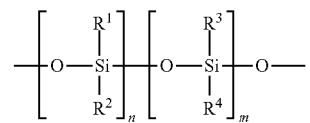 (1)

wherein in the general formula (1), polysiloxane repeating units may be in any order; $R^1$ and $R^2$ are each independently a C1-18 organic group comprising no fluorine atom; $R^3$ and $R^4$ are each independently an organic group comprising at least three fluorine atoms, or a C1-18 organic group comprising no fluorine atom, wherein at least one of $R^3$ and $R^4$ is the organic group comprising at least three fluorine atoms; n is an integer of 0 or more; m is an integer of 1 or more; and n+m is 5 to 2000;

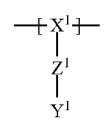 (2)

wherein in the general formula (2), $X^1$ is a repeating unit obtainable by polymerization of an ethylenically unsaturated group; $Y^1$ is a side chain consisting of a substituted or unsubstituted C1-40 hydrocarbyl group; $Z^1$ is a linking group linking the repeating unit $X^1$ and the side chain $Y^1$;

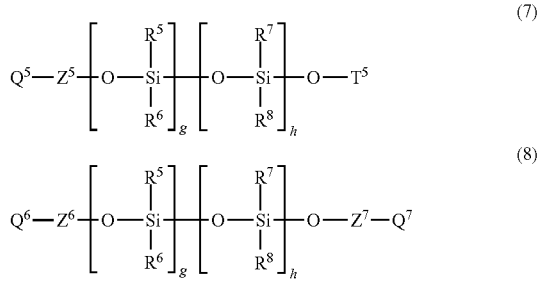

wherein in the general formulae (7) and (8), polysiloxane repeating units may be in any order; $R^5$ and $R^6$ are each independently a C1-18 organic group comprising no fluorine atom; $R^7$ and $R^8$ are each independently an organic group comprising at least three fluorine atoms, or a C1-18 organic group comprising no fluorine atom, wherein at least one of $R^7$ and $R^8$ is the organic group comprising at least three fluorine atoms; $Q^5$, $Q^6$, and $Q^7$ are each independently a polymerizable functional group comprising an ethylenically unsaturated group; $Z^5$ is a linking group linking the polymerizable functional group $Q^5$ and the polysiloxane moiety; $Z^6$ is a linking group linking the polymerizable functional group $Q^6$ and the polysiloxane moiety; $Z^7$ is a linking group linking the polymerizable functional group $Q^7$ and the polysiloxane moiety; $T^5$ is a non-polymerizable organic group; g is an integer of 1 or more; h is an integer of 1 or more; and g+h is 5 to 2000; and $$Q^8\text{-}Z^8\text{—}Y^8 \qquad (9)$$

wherein in the general formula (9), $Q^8$ is a polymerizable functional group comprising an ethylenically unsaturated group; $Y^8$ is a substituted or unsubstituted C1-40 hydrocarbyl group; and $Z^8$ is a linking group linking $Q^8$ and $Y^8$.

[24] The defoaming agent composition according to [23], further comprising:
a diluting solvent comprising at least one solvent selected from the group consisting of: hydrocarbon solvents having at least 6 carbons, mineral oils, synthetic oils, ester oils, aliphatic ethers having at least 4 carbons, esters of aliphatic monocarboxylic acids having at least 2 carbons and C1-5 monoalcohols, aliphatic ketones having at least 3 carbons, aliphatic alcohols having at least 4 carbons, and halogenated hydrocarbons.

Advantageous Effects of Invention

The lubricating oil composition according to the present invention can suppress deterioration of defoaming performance even during long-term storage, and can maintain deforming effect of a lubricating oil for a long term even under such lubricating conditions that the lubricating oil is subjected to high centrifugal effect and high shear stress.

The method for defoaming a lubricating oil according to the present invention can effectively suppress deterioration of defoaming effect due to segregation, precipitation, and shearing of a defoaming agent.

The defoaming agent composition according to the present invention may be preferably used for preparation of the lubricating oil composition according to the present invention, and in the method for defoaming a lubricating oil according to the present invention.

BRIEF DESCRIPTION OF DRAWINGS

FIG. 1 is an explanatory view of the structure of a homogenizer test machine used for evaluation of defoaming effect.

DETAILED DESCRIPTION OF EMBODIMENTS

The present invention will be described hereinafter. In the present description, expression "A to B" concerning numeral values A and B shall mean "no less than A and no more than B" unless otherwise specified. In such expression, if a unit is added only to the numeral value B, the same unit shall be applied to the numeral value A. A word "or" shall mean a logical sum unless otherwise specified. In the present description, expression "$E_1$ and/or $E_2$" concerning elements $E_1$ and $E_2$ shall mean "$E_1$, or $E_2$, or the combination thereof", and expression "$E_1, \ldots, E_{N-1}$, and/or $E_N$" concerning the elements $E_1, \ldots, E_N$ (N is an integer of 3 or more) shall mean "$E_1, \ldots, E_{N-1}$, or $E_N$, or any combination thereof".

<1. Lubricating Oil Composition>

A lubricating oil composition according to the present invention comprises a lubricating base oil, (A) a first defoaming agent, and (B) a second defoaming agent.

(1.1 Lubricating Base Oil)

The lubricating base oil in the lubricating oil composition according to the present invention is not specifically restricted, and a mineral base oil or a synthetic base oil used for conventional lubricating oils may be used. In one embodiment, at least one mineral base oil, at least one synthetic base oil, or any mixed base oil thereof may be used as the lubricating base oil. In one embodiment, a Group II base oil (hereinafter may be referred to as "API Group II base oil" or simply "Group II base oil"), a Group III base oil (hereinafter may be referred to as "API Group III base oil" or simply "Group III base oil"), a Group IV base oil (hereinafter may be referred to as "API Group IV base oil" or simply "Group IV base oil"), or a Group V base oil of API base stock categories (hereinafter may be referred to as "API Group V base oil" or simply "Group V base oil"), or a mixed base oil thereof may be used. API Group II base oils are mineral base oils containing no more than 0.03 mass % sulfur and no less than 90 mass % saturates, and having a viscosity index of no less than 80 and less than 120. API Group III base oils are mineral base oils containing no more than 0.03 mass % sulfur and no less than 90 mass % saturates, and having a viscosity index of no less than 120. API Group IV base oils are poly-α-olefin base oils. API Group V base oils are base oils other than the Groups I to IV base oils, and preferred examples thereof are ester base oils.

Examples of the mineral base oil include: oils obtained by refining lubricant oil fractions that are obtained by vacuum distillation of atmospheric residue obtained by atmospheric distillation of crude oil, through at least one of processes such as solvent deasphalting, solvent extraction, hydrocracking, solvent dewaxing, and hydrorefining; wax isomerized mineral oils; and lubricant base oils produced by a process of isomerizing GTL WAX (gas to liquid wax) that is produced by a Fischer-Tropsch process, and the like.

Examples of API Group IV base oils include ethylene-propylene copolymers, polybutene, 1-octene oligomers, and 1-decene oligomers, and hydrogenated products thereof.

Examples of API Group V base oils include monoesters (such as butyl stearate, octyl laurate, and 2-ethylhexyl oleate); diesters (such as ditridecyl glutarate, bis(2-ethylhexyl) adipate, diisodecyl adipate, ditridecyl adipate, and bis(2-ethylhexyl) sebacate); polyesters (such as trimellitate esters); and polyol esters (such as trimethylolpropane caprylate, trimethylolpropane pelargonate, pentaerythritol 2-ethylhexanoate, and pentaerythritol pelargonate).

The kinematic viscosity of the lubricating base oil (total base oil) at 100° C. is preferably no more than 50 mm²/s, more preferably no more than 15 mm²/s, and further preferably no more than 10 mm²/s in view of fuel efficiency. This kinematic viscosity is preferably no less than 1.0 mm²/and more preferably no less than 2.0 mm²/s in view of anti-wear performance on sliding parts of various kinds of machinery. In one embodiment, this kinematic viscosity may be 1.0 to 50 mm²/s, or 2.0 to 15 mm²/s, or 2.0 to 10 mm²/s. In the present description, "kinematic viscosity at 100° C." means a kinematic viscosity at 100° C. specified in ASTM D-445.

The pour point of the lubricating base oil (total base oil) is not specifically restricted, but preferably is no more than −10° C., and more preferably no more than −15° C.

The viscosity index of the lubricating base oil (total base oil) is preferably no less than 105 in view of prevention of viscosity decrease at high temperature. In the present description, a viscosity index means a viscosity index measured conforming to JIS K 2283-1993.

The content of the lubricating base oil (total base oil) in the lubricating oil composition is preferably no less than 70 mass % and more preferably no less than 75 mass %, and in one embodiment, may be no less than 80 mass % on the basis of the total mass of the composition. The upper limit of this content is not particularly limited. In one embodiment, the lubricating oil composition may be a composition comprising the lubricating base oil (total base oil), and a defoaming agent in a small amount enough to lead to defoaming effect, and for example, the content of the total base oil in the lubricating oil composition may be more than 99 mass %. In another embodiment, the content of the total base oil in the lubricating oil composition may be, for example, no more than 95 mass %.

(1.2 (A) First Defoaming Agent)

As the (A) first defoaming agent, (A1) a first polymer, or (A2) a second polymer, or any combination thereof may be used.

(1.2.1 (A1) First Polymer)

The (A1) first polymer (hereinafter may be referred to as "polymer (A1)") comprises: at least one first polymer chain comprising a polysiloxane structure, the polysiloxane structure having a polymerization degree of 5 to 2000 and being represented by the following general formula (1); and at least one second polymer chain bonded with the first polymer chain, the second polymer chain comprising a repeating unit represented by the following general formula (2):

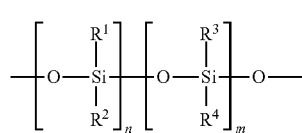
(1)

in the general formula (1), polysiloxane repeating units may be in any order; $R^1$ and $R^2$ are each independently a C1-18 organic group comprising no fluorine atom; $R^3$ and $R^4$ are each independently an organic group comprising at least three fluorine atoms, or a C1-18 organic group comprising no fluorine atom, wherein at least one of $R^3$ and $R^4$ is the organic group comprising at least three fluorine atoms; n is an integer of 0 or more; m is an integer of 1 or more; and n+m is 5 to 2000; and

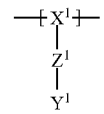
(2)

in the general formula (2), $X^1$ is a repeating unit obtainable by polymerization of an ethylenically unsaturated group; $Y^1$ is a side chain consisting of a substituted or unsubstituted C1-40 hydrocarbyl group; and $Z^1$ is a linking group linking the repeating unit $X^1$ and the side chain $Y^1$.

(1.2.1.1 Second Polymer Chain)

For the sake of convenience, the second polymer chain will be described before the first polymer chain is described. In the second polymer chain, $X^1$ may be a combination of two or more repeating units, $Y^1$ may be a combination of two or more side chains, and $Z^1$ may be a combination of two or more linking groups.

The linking group $Z^1$ is not specifically limited as long as being able to link the repeating unit (main chain skeleton) $X^1$ and the side chain $Y^1$. Preferable examples of $Z^1$ include linking groups having an ester bond, an amide bond, an ether bond, a thioether bond, a thioester bond, a thionoester bond, a thioamide bond, or an imide bond. The linking group $Z^1$ may comprise one or more groups selected from a linear or branched chain alkyl or alkylene group, an alicyclic group, and an aromatic group, in addition to the above described chemical bonds. The carbon number of the linking group $Z^1$ is not specifically limited, but is no less than 0, preferably no more than 12, and more preferably no more than 6.

$Y^1$ is a side chain consisting of a substituted or unsubstituted C1-40 hydrocarbyl group. Examples of an unsubstituted C1-40 hydrocarbyl group include: alkyl groups (that may have a ring structure), alkenyl groups (that may have a double bond in any position, and may have a ring structure), aryl groups (that may have an alkyl or alkenyl group), arylalkyl groups, and arylalkenyl groups.

Examples of the alkyl group include various linear or branched chain alkyl groups. Examples of a ring structure that the alkyl group may have include: cycloalkyl groups having 5 to 7 carbon atoms such as cyclopentyl group, cyclohexyl group, and cycloheptyl group. A chain hydrocarbyl substituent, if any, may be in any position on the ring structure.

Examples of the alkenyl group include various linear or branched chain alkenyl groups. Examples of a ring structure that the alkenyl group may have include the above described cycloalkyl group, and cycloalkenyl group having 5 to 7 carbon atoms such as cyclopentenyl group, cyclohexenyl group, and cycloheptenyl group. A chain hydrocarbyl substituent, if any, may be in any position on the ring structure.

Examples of the aryl group include phenyl group and naphthyl group. In the alkylaryl group, the alkenylaryl group, the arylalkyl group, and the arylalkenyl group, a substituent may be in any position on an aromatic ring.

The unsubstituted hydrocarbyl group as $Y^1$ is preferably an aliphatic hydrocarbyl group, more preferably a chain aliphatic hydrocarbyl group, and further preferably an alkyl group.

$Y^1$ may be an unsubstituted hydrocarbyl group, or may be a substituted hydrocarbyl group, or may be a combination of unsubstituted and substituted hydrocarbyl groups. One preferred example of the substituted hydrocarbyl group as $Y^1$ is a group obtained by substituting at least one hydrogen atom of an unsubstituted hydrocarbyl group (preferably an aliphatic hydrocarbyl group, more preferably a chain aliphatic hydrocarbyl group, and especially preferably an alkyl group. The same will be applied in this paragraph.) with (a) heteroatom-containing group(s) (the heteroatom is preferably oxygen, nitrogen, sulfur, or any combination thereof); substituting at least one methylene group (—$CH_2$— group) of the unsubstituted hydrocarbyl group with (an) ether bond(s) (—O— group), (a) secondary amino group(s) (—NH— group), or (a) thioether bond(s) (—S— group); substituting at least one methine group (>CH— group) of the unsubstituted hydrocarbyl group with (a) tertiary amino group(s) (>N— group); or any combination of those substitutions. The number of heteroatoms contained in such an example of $Y^1$ is preferably 1 to 3. Other preferred examples of the substituted hydrocarbyl group as $Y^1$ include polyether groups, fluoroalkyl groups, and fluoroalkyl (poly)ether groups.

Preferred examples of the heteroatom-containing group(s) include: hydroxy group; mercapto group; primary amino group; amine residues having 1 to 2 nitrogen atoms and 0 to 2 oxygen atoms such as dimethylamino group, diethylamino group, dipropylamino group, dibutylamino group, anilino group, toluidino group, xylidino group, acetylamino group, and benzoylamino group; heterocyclic residues having 1 to 2 nitrogen atoms and 0 to 2 oxygen atoms such as morpholino group, pyrrolyl group, pyrrolino group, pyridyl group, methylpyridyl group, pyrrolidinyl group, piperidinyl group, piperidino group, quinolyl group, pyrrolidonyl group, pyrrolidono group, imiazolino group, and pyrazinyl group; and C2-5 cyclic ether residues such as epoxy group, oxetanyl group, tetrahydrofuranyl group, and tetrahydropyranyl group.

Preferred examples of the polyether group include the groups represented by the following general formula (12):

(12)

in the general formula (12), $R^{13}$ is a C2-4, preferably C2-3 alkylene group, a plurality of $R^{13}$ may be the same as, or may be different from each other; a is an integer of no less than 2 and makes the carbon number in the general formula (12) no more than 40; and $R^{14}$ is hydrogen or a C1-5 alkyl group.

Preferred examples of the fluoroalkyl group include: C1-4 perfluoroalkyl groups; the groups represented by the following general formula (13); the groups represented by the following general formula (14); 1,1,1,3,3,3-hexafluoro-2-propyl group; 2,2-bis(trifluoromethyl)propyl group; perfluorocyclohexylmethyl group; pentafluorobenzyl group; 2,3,5,6-tetrafluorophenyl group; 2,2,2-trifluoro-1-phenyl-1-(trifluoromethyl)ethyl group; and 3-(trifluoromethyl)benzyl group:

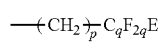
(13)

in the formula (13), E is a fluorine atom or hydrogen atom; p is an integer of 1 to 6; q is an integer of 1 to 15; and when q is 1, E is a fluorine atom.

In the general formula (13), q is preferably no less than 2 in view of improvement of defoaming effect, and preferably no more than 8 in view of easy avoidance of degradation of the deforming effect induced by solidification of the polymer. In one embodiment, q may be 2 to 8:

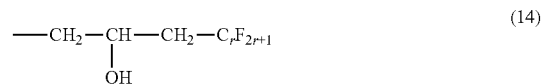
(14)

in the formula (14), r is an integer of 2 to 9.

In the general formula (14), r is preferably no less than 4 in view of improvement of defoaming effect, and preferably no more than 8 in view of easy avoidance of degradation of the deforming effect induced by solidification of the polymer. In one embodiment, r may be 4 to 8.

Examples of the C1-4 perfluoroalkyl groups include: trifluoromethyl group, perfluoroethyl group, perfluoropropyl group, perfluoroisopropyl group, and perfluoro-tert-butyl group.

Examples of the groups represented by the general formula (13) include: 2,2,2-trifluoroethyl group; 3,3,3-trifluoropropyl group; 1H,1H,3H-hexafluorobutyl group; 2-(perfluorobutyl)ethyl group; 3-(perfluorobutyl)propyl group; 6-(perfluorobutyl)hexyl group; 2-(perfluoro-5-methylhexyl)ethyl group; 2-(perfluoro-7-methyloctyl)ethyl group; 4,4,5,5,5-pentafluoropentyl group; 2-(perfluorohexyl)ethyl group; 2-(perfluorooctyl)ethyl group; 3-(perfluorohexyl)propyl group; 3-(perfluorooctyl)propyl group; 1H,1H,3H-tetrafluoropropyl group; 1H,1H,5H-octafluoropentyl group; 1H,1H,7H-dodecafluoroheptyl group; 1H,1H,9H-hexadecafluorononyl group; 6-(perfluoro-1-methylethyl)hexyl group; 1H,1H-(3,5,5-tris(trifluoromethyl))octafluorohexyl group; 1H,1H,11H-eicosafluoroundecyl group; 2-(perfluoro-3-methylbutyl)ethyl group; 1H,1H-perfluoropropyl group; 1H,1H-perfluorobutyl group; 1H,1H-perfluoropentyl group; 1H,1H-perfluorohexyl group; 1H,1H-perfluoroheptyl group; 1H,1H-perfluorooctyl group; 1H,1H-perfluorononyl group; 1H,1H-perfluorodecyl group; 1H,1H-perfluoroundecyl group; 1H,1H-perfluorododecyl group; 1H,1H-perfluorotetradecyl group; 1H,1H-perfluorohexadecyl group; 1H,1H-perfluoro-3,7-dimethyloctyl group; 2-(perfluorodecyl)ethyl group; 2-(perfluorododecyl)ethyl group; and 2-(perfluoro-9-methyldecyl)ethyl group.

Examples of the groups represented by the general formula (14) include: 3-(perfluorobutyl)-2-hydroxypropyl group; 3-(perfluoro-3-methylbutyl)-2-hydroxypropyl group; 3-(perfluorooctyl)-2-hydroxypropyl group; 3-(perfluoro-5-methylhexyl)-2-hydroxypropyl group; and 3-(perfluoro-7-methyloctyl)-2-hydroxypropyl group.

Preferred examples of the fluoroalkyl (poly)ether groups include: the groups represented by the following general formula (15); 2-[(perfluoropropanoyl)oxy]ethyl group; and fluoropolyether groups comprising a perfluoropolyethylene oxide group, a perfluoropolypropylene oxide group, or a perfluoropolyoxetane group, and fluoropolyether copolymer groups thereof:

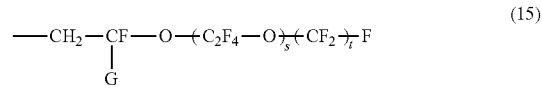
(15)

in the formula (15), G is a fluorine atom or a trifluoromethyl group; s is an integer of 0 to 2; and t is an integer of 1 to 4.

Examples of the groups represented by the general formula (15) include: 1H,1H-perfluoro-3,6-dioxadecyl group; 1H,1H-perfluoro-3,6,9-trioxadecyl group; 1H,1H-perfluoro-3,6,9-trioxadecyl group; 2-perfluoropropoxy-2,3,3,3-tetrafluoropropyl group; and 1H,1H-perfluoro-2,5-dimethyl-3,6-dioxanonyl group.

Among the above described groups, any group represented by the general formula (13) may be especially preferably employed as the substituted hydrocarbyl group having a fluorine atom.

The ratio (hereinafter may be referred to as "average functionalization ratio") of the total number of $Y^1$ being (a) substituted hydrocarbyl group(s) to the total number of $Y^1$ in the polymer is usually 0 to 0.5, preferably 0 to 0.3, and more preferably 0 to 0.1 in view of further suppression of precipitation of the defoaming agent to further improve the lifetime of the defoaming agent. In one embodiment, this ratio may be 0.

The carbon number of $Y^1$ is 1 to 40, preferably 8 to 36, more preferably 12 to 24, and further preferably 12 to 18.

(1.2.1.2 First Polymer Chain)

In the first polymer chain, the polysiloxane repeating units may be arranged in any order. In the general formula (1), when n and m are each no less than 1, the polysiloxane structure may be a random copolymer, or may be an alternating copolymer, or may be a block copolymer.

In the first polymer chain, the polymerization degree of the polysiloxane structure (n+m) is 5 to 2000, preferably 50 to 1500, and more preferably 100 to 1000. The polymerization degree of the polysiloxane structure at this lower limit or over can improve the defoaming effect of the defoaming agent. The polymerization degree of the polysiloxane structure at this upper limit or below can further suppress precipitation of the defoaming agent, to further improve the lifetime of the defoaming agent.

In the first polymer (A1), the ratio (hereinafter may be simply referred to as "average fluorination ratio of the polysiloxane structure") of the total number of the polysiloxane repeating units comprising fluorine atoms (—O—$SiR^3R^4$—) to the total number of all the polysiloxane repeating units (—O—$SiR^1R^2$— repeating unit and —O—$SiR^3R^4$— repeating unit: see the general formula (1)) is usually 0.01 to 1, preferably no less than 0.05, and more preferably no less than 0.10, and may be even 1 in view of improvement of the defoaming effect after shearing. In view of further suppression of precipitation of the defoaming agent to further improve the lifetime of the defoaming agent, this ratio is preferably no more than 0.99, more preferably no more than 0.90, and further preferably no more than 0.75. In one embodiment, this ratio may be 0.01 to 0.99, or 0.05 to 0.90, or 0.10 to 0.75.

In the general formula (1), examples of the C1-18 organic group comprising no fluorine atom include substituted or unsubstituted alkyl groups, substituted or unsubstituted phenyl groups, and polyether groups. Examples of substituents in the substituted alkyl groups and substituted phenyl groups include hydroxy group, amino group, ether bond, and ester bond. The carbon number of the organic group is 1 to 18, and in one embodiment 1 to 12, and in another embodiment 1 to 6. Preferred examples of the organic group include methyl group and phenyl group. Among them, methyl group may be especially preferably employed.

In the general formula (1), a fluoroalkyl group or a fluoroalkyl (poly)ether group may be preferably employed as the organic group comprising at least three fluorine atoms (hereinafter may be referred to as "fluorinated organic group").

The number of fluorine atoms in the fluorinated organic group is no less than 3, and preferably no less than 5. This number is preferably no more than 17 in view of easy avoidance of degradation of the deforming effect induced by solidification of the polymer. The number of fluorine atoms at this lower limit or over improves the defoaming effect.

The same group as that of the fluoroalkyl group described above concerning $Y^1$ in the general formula (2) may be employed as the fluoroalkyl group, and preferred examples thereof are also the same as described above. The same group as that of the fluoroalkyl (poly)ether group described above concerning $Y_1$ in the general formula (2) may be employed as the fluoroalkyl (poly)ether group, and preferred examples thereof are also the same as described above.

Among the above described groups, any group represented by the general formula (13) may be especially preferably employed as the fluorinated organic group.

In one embodiment, the second polymer chain may be bonded with one terminal or both terminals of the first polymer chain. In one embodiment, the first polymer chain is represented by any of the following general formulae (3) to (6):

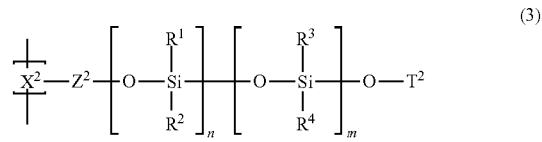

(3)

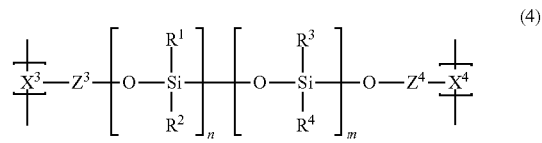

(4)

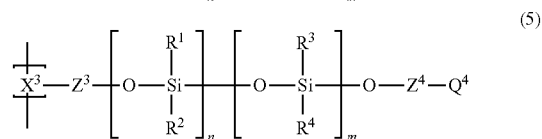

(5)

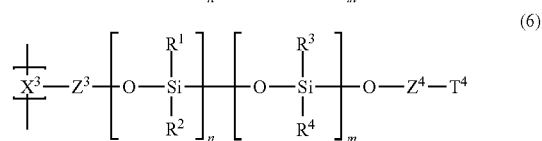

(6)

in the general formulae (3) to (6), the polysiloxane repeating units may be in any order; $R^1$, $R^2$, $R^3$, $R^4$, n and m are as previously defined; $X^2$, $X^3$, and $X^4$ are each independently a repeating unit obtainable by polymerization of an ethylenically unsaturated group; $T^2$ is a non-polymerizable organic group; $Q^4$ is a polymerizable functional group giving the repeating unit $X^4$ upon polymerization; $T^4$ is an organic group derived from the polymerizable functional group $Q^4$ by a reaction other than polymer chain elongation; $Z^2$ is a linking group linking the repeating unit $X^2$ and the polysiloxane moiety; $Z^3$ is a linking group linking the repeating unit $X^3$ and the polysiloxane moiety; and $Z^4$ is a linking group linking the repeating unit $X^4$, the polymerizable functional group $Q^4$, or the organic group $T^4$ with the polysiloxane moiety.

In the general formulae (3) to (6), $X^2$, $X^3$ and $X^4$ may be each independently a combination of at least two repeating units; $Q^4$ may be a combination of at least two polymerizable functional groups corresponding to $X^4$; $T^4$ may be a combination of at least two organic groups; and $Z^2$, $Z^3$ and $Z^4$ may be each independently a combination of at least two linking groups.

In the general formulae (3) to (6), the repeating units $X^2$, $X^3$ and $X^4$ may be each independently bonded to the repeating unit $X^1$ of the second polymer chain (the general formula (2)), or may be each independently bonded to another repeating unit ($X^2$, $X^3$ or $X^4$) of the first polymer chain. That is, in the general formulae (3) to (6), the first polymer chain may be bonded to the second polymer chain at $X^2$, $X^3$ or $X^4$.

As can be seen from the general formulae (3) to (6), the at least one second polymer chain may be bonded with one terminal or both terminals of the first polymer chain. In one embodiment, at least one second polymer chain may be bonded with only one terminal of the first polymer chain (the general formulae (3), (5) and (6)). In another embodiment, the at least one second polymer chain may be bonded with both terminals of at least one of the first polymer chain (the general formula (4)).

At a chain terminal of the first polymer chain, the chain terminal not being bonded to the second polymer chain, for example, a terminal of the polysiloxane chain may be bonded to the (a) non-polymerizable organic group $T^2$ as shown in the general formula (3), or may be bonded to the (b) polymerizable functional group $Q^4$ via the linking group $Z^4$ as shown in the general formula (5), or may be bonded to (c) the organic group $T^4$ derived from the polymerizable functional group $Q^4$ by a reaction other than polymer chain elongation via the linking group $Z^4$ as shown in the general formula (6).

In the general formula (3), $T^2$ may be, for example, the same group as any of $R^1$ to $R^4$, or may be, for example, a C1-40 hydrocarbyl group, or may be a monovalent C1-40 organic group having at least one functional group (such as hydroxy group, amino group, ether bond, ester bond, and amide bond), or may be a hydrogen atom.

In the general formulae (3) to (6), $X^2$ to $X^4$ are each independently a repeating unit obtainable by polymerization of an ethylenically unsaturated group. As described later, in one embodiment, $X^2$ to $X^4$ may be each independently a repeating unit obtainable by polymerization of (meth)acryloyl group.

In the general formula (5), $Q^4$ is a polymerizable functional group giving the repeating unit $X^4$ upon polymerization, that is, a functional group having a polymerizable ethylenically unsaturated group.

In the general formulae (3) to (6), the linking group $Z^2$ is not specifically limited as long as being able to link the polysiloxane structure and the repeating unit $X^2$. The linking group $Z^3$ is not specifically limited as long as being able to link the polysiloxane structure and the repeating unit $X^3$. The linking group $Z^4$ is not specifically limited as long as being able to link the polysiloxane structure and the repeating unit $X^4$ (or the polymerizable functional group $Q^4$ or the organic group $T^4$). The linking groups $Z^2$, $Z^3$ and $Z^4$ may be the same as or different from each other. Preferred examples of the linking groups $Z^2$ to $Z^4$ include linking groups having a carbonyl group, an ester bond, an amide bond, an ether bond, a thioether bond, a thioester bond, a thionoester bond, a thioamide bond, or an imide bond. The linking groups $Z^2$ to $Z^4$ may comprise one or more groups selected from linear or branched chain alkyl or alkylene groups, saturated or aromatic dihydrocarbylsilylene groups, alicyclic groups, aromatic groups, and the like in addition to the above described chemical bonds. In one embodiment, the linking groups $Z^2$ to $Z^4$ may have: a chain saturated or alicyclic saturated or aromatic dihydrocarbylsilylene group bonded to the polysiloxane structure; a linear or branched chain alkylene group bonded to the forgoing silylene group; and a bond linking the alkylene group and the repeating units $X^2$ to $X^4$ or polymerizable functional group $Q^4$ or organic group $T^4$ (such as an ester bond, an amide bond, an ether bond, a thioether bond, a thioester bond, a thionoester bond, a thioamide bond, or an imide bond; preferably an ester bond, an amide bond or a thioester bond). In another embodiment, the linking groups $Z^2$ to $Z^4$ may have: a linear or branched chain alkylene group bonded to the polysiloxane structure; and a bond linking the foregoing alkylene group and the repeating units $X^2$ to $X^4$ or the polymerizable functional group $Q^4$ or the organic group $T^4$ (such as an ester bond, an amide bond, an ether bond, a thioether bond, a thioester bond, a thionoester bond, a thioamide bond, or an imide bond; preferably an ester bond, an amide bond or a thioester bond). The carbon number of the linking groups $Z^2$ to $Z^4$ is not specifically limited, and is no less than 0, preferably 1 to 30, and more preferably 1 to 24.

In the general formula (6), $T^4$ is an organic group derived from the polymerizable functional group $Q^4$ by a reaction other than polymer chain elongation. As the reaction other than polymer chain elongation, a reaction which can occur during the polymerization reaction of ethylenically unsaturated groups and are other than polymer chain elongation is anticipated. Examples of such a reaction include: a reaction in which a propagating radical which has been formed by addition of a radical species other than the other propagating radicals (such as primary radicals formed from polymerization initiators used in the polymerization reaction (such as azo polymerization initiators or peroxide polymerization initiators)) to the polymerizable ethylenically unsaturated group of $Q^4$ deactivates without experiencing elongation of a polymer chain (by, for example, termination by disproportionation, recombination with another primary radical, etc.); a reaction in which a propagating radical which has been formed by chain transfer of another radical species and the polymerizable ethylenically unsaturated group of $Q^4$ (at the same time with deactivation of the other propagating radial) deactivates without experiencing elongation of a polymer chain; and chain transfer to a polymerization solvent.

The polymer (A1) has at least one first polymer chain and at least one second polymer chain bonded to the first polymer chain. The content of the first polymer chain in the polymer (A1) on the basis of the total mass of the polymer (A1) (100 mass %) is preferably no less than 0.5 mass %, more preferably no less than 1 mass %, further preferably no less than 2 mass %, and especially preferably no less than 4 mass % in view of further improvement of the defoaming effect. In view of further suppression of precipitation of the defoaming agent to further improve the lifetime of the defoaming agent, this content is preferably no more than 80 mass %, more preferably no more than 75 mass %, and further preferably no more than 70 mass %. In one embodiment, this content may be 0.5 to 80 mass %, or 1 to 75 mass %, or 2 to 75 mass %, or 4 to 70 mass %.

The content of the repeating units represented by the general formula (2) in the polymer (A1) on the basis of the total mass of the polymer (A1) (100 mass %) is preferably no less than 20 mass %, more preferably no less than 25 mass %, and further preferably no less than 30 mass % in view of further suppression of precipitation of the defoaming agent to further improve the lifetime of the defoaming agent. In view of further improvement of the defoaming effect, this content is preferably no more than 99.5 mass %, more preferably no more than 99 mass %, further preferably no more than 98 mass %, and particularly preferably no more than 96 mass %. In one embodiment, this content may be 20 to 99.5 mass %, or 25 to 99 mass %, or 25 to 98 mass %, or 30 to 96 mass %.

The polymer (A1) has a weight average molecular weight of preferably no less than 10,000, more preferably no less than 12,000, further preferably no less than 14,000, especially preferably no less than 15,000, and in one embodiment, no less than 80,000 in view of further improvement of the defoaming effect. In view of further suppression of precipitation of the defoaming agent to further improve the lifetime of the defoaming agent, this weight average molecular weight is preferably no more than 1,000,000, more preferably no more than 500,000, further preferably no more than 400,000, and particularly preferably no more than 300,000. In one embodiment, this weight average molecular weight may be 10,000 to 1,000,000, or 12,000 to 500,000, or 14,000 to 400,000, or 15,000 to 300,000, or 80,000 to 300,000. In the present description, a weight average molecular weight means weight average molecular weight in terms of polystyrene which is measured by gel permeation chromatography (GPC) using polystyrene as a standard material. The measurement conditions for GPC are as follows.

[GPC Measurement Conditions]
column: three columns of TSKgel Super Multipore HZ-M (4.6 mm in internal diameter×15 cm) manufactured by Tosoh Corporation, connected in series
device: HLC-8220 manufactured by Tosoh Corporation
mobile phase: tetrahydrofuran
detector: differential refractometer (RI)
measurement temperature: 40° C.
flow rate: 0.35 mL/min
sample concentration: 1 mass %
sample injection volume: 5 μL
standard material: polystyrene The first polymer chain has a weight average molecular weight of preferably no less than 500, more preferably no less than 5,000, and further preferably no less than 10,000 in view of improvement of the defoaming effect. In view of further suppression of precipitation of the defoaming agent to further improve the lifetime of the defoaming agent, this weight average molecular weight is preferably no more than 500,000, more preferably no more than 250,000, further preferably no more than 150,000, and particularly preferably no more than 100,000. In one embodiment, this weight average molecular weight may be 500 to 500,000, or 5,000 to 250,000, or 10,000 to 150,000, or 10,000 to 100,000.

(1.2.2 Producing Polymer (A1) (1): (A2) Second Polymer)

In one embodiment, the polymer (A1) can be obtained by a copolymer of a first monomer component and a second monomer component, the first monomer component being at least one polysiloxane macromonomer selected from the compounds represented by the following general formula (7) or (8), the second monomer component being at least one monomer represented by the following general formula (9). In the present description, this copolymer is particularly referred to as "(A2) second polymer" or "polymer (A2)".

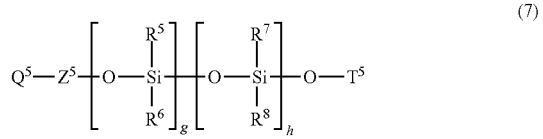

(7)

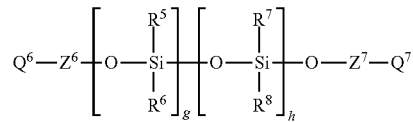

(8)

In the general formulae (7) and (8), the polysiloxane repeating units may be in any order; $R^5$ and $R^6$ are each independently a C1-18 organic group comprising no fluorine atom; $R^7$ and $R^8$ are each independently an organic group comprising at least three fluorine atoms or a C1-18 organic group comprising no fluorine atom, wherein at least one of $R^7$ and $R^8$ is the organic group comprising at least three fluorine atoms; $Q^5$, $Q^6$, and $Q^7$ are each independently a polymerizable functional group comprising an ethylenically unsaturated group; $Z^5$ is a linking group linking the polymerizable functional group $Q^5$ and the polysiloxane moiety; $Z^6$ is a linking group linking the polymerizable functional group $Q^6$ and the polysiloxane moiety; $Z^7$ is a linking group linking the polymerizable functional group $Q^7$ and the polysiloxane moiety; $T^5$ is a non-polymerizable organic group; g is an integer of 0 or more; h is an integer of 1 or more; and g+h is 5 to 2000; and $$Q^8\text{-}Z^8\text{—}Y^8 \qquad (9)$$

in the general formula (9), $Q^8$ is a polymerizable functional group comprising an ethylenically unsaturated group; $Y^8$ is a substituted or unsubstituted C1-40 hydrocarbyl group; and $Z^8$ is a linking group linking $Q^8$ and $Y^8$.

As a result of the copolymerization, the first monomer component gives one first polymer chain per one molecule, and the second monomer component gives the second polymer chain by polymerization of a plurality of monomer molecules (general formula (9)). The compound represented by the general formula (7) gives the first polymer chain represented by the general formula (3), and the compound represented by the general formula (8) gives the first polymer chain represented by any one of the general formulae (4) to (6). As regards the first monomer component, one compound represented by the general formula (7) may be used alone, or two or more compounds represented by the general formula (7) may be used in combination; and one compound represented by the general formula (8) may be used alone, or two or more compounds represented by the general formula (8) may be used in combination. As the first monomer component, any compound represented by the general formula (7) may be used alone, or any compound represented by the general formula (8) may be used alone, or compounds represented by the general formulae (7) and (8) respectively may be used in combination. As the second monomer component, one monomer represented by the general formula (9) may be used alone, or two or more monomers represented by the general formula (9) may be used in combination.

In the general formulae (7) to (9), $Q^5$ to $Q^8$ may be each independently a combination of at least two polymerizable functional groups. In the general formulae (7) to (9), $Z^5$ to $Z^8$ may be each independently a combination of at least two linking groups. $T^5$ may be a combination of at least two organic groups. $Y^8$ may be a combination of at least two substituted or unsubstituted hydrocarbyl groups.

In the general formula (7), the same group as described above concerning $T^2$ in the general formula (3) may be employed as $T^5$, and preferred examples thereof are also the same as described above.

In the general formula (9), the same group as described above as the linking group $Z^1$ in the general formula (2) may be employed as the linking group $Z^8$, and preferred examples thereof are also the same as described above.

In the general formula (9), the same group as described above concerning the substituted or unsubstituted hydrocarbyl group as the side chain $Y^1$ in the general formula (2) may be employed as the substituted or unsubstituted hydrocarbyl group $Y^8$, and preferred examples thereof are also the same as described above.

In the general formulae (7) and (8), the polysiloxane repeating units may be arranged in any order. In the general formulae (7) and (8), when g and h are each no less than 1, the polysiloxane structure may be a random copolymer, or may be an alternating copolymer, or may be a block copolymer.

In the general formulae (7) and (8), preferred examples of the polymerization degree of the polysiloxane structure (g+h) are the same as the polymerization degree of the polysiloxane structure (n+m: see the general formula (1)) described above concerning the first polymer chain.

In the first monomer component, the average fluorination ratio of the polysiloxane structure, that is, the ratio of the total number of the polysiloxane repeating units comprising fluorine atoms (—O—$SiR^7R^8$—) to the total number of all the polysiloxane repeating units (—O—$SiR^5R^6$— repeating unit and —O—$SiR^7R^8$— repeating unit) is, as described above, usually 0.01 to 1, preferably no less than 0.05, and more preferably no less than 0.10, and may be even 1 in view of improvement of the defoaming effect after shearing. In view of further suppression of precipitation of the defoaming agent to further improve the lifetime of the defoaming agent, this average fluorination ratio is preferably no more than 0.99, more preferably no more than 0.90, and further preferably no more than 0.75. In one embodiment, this average fluorination ratio may be 0.01 to 0.99, or 0.05 to 0.90, or 0.10 to 0.75.

In the general formulae (7) and (8), the groups same as those described above as C1-18 organic groups each comprising no fluorine atom in the general formula (1) may be employed as C1-18 organic groups comprising no fluorine atom. Preferred examples thereof are also the same as those described above.

In the general formulae (7) and (8), the groups same as those described above as organic groups each comprising at least three fluorine atoms (fluorinated organic groups) in the general formula (1) may be employed as organic groups comprising at least three fluorine atoms (fluorinated organic groups). Preferred examples thereof are also the same as described above.

In the second monomer component, the average functionalization ratio of the hydrocarbyl group $Y^8$, that is, the ratio of the total number of $Y^8$ being a substituted hydrocarbyl group(s) to the total number of $Y^8$ in the second component is, as described above, usually 0 to 0.5, preferably 0 to 0.3, and more preferably 0 to 0.1 in view of further suppression of precipitation of the defoaming agent to further improve the lifetime of the defoaming agent. In one embodiment, this average functionalization ratio may be 0.

The first monomer component has a weight average molecular weight of preferably no less than 500, more preferably no less than 5,000, and further preferably no less than 10,000 in view of further improvement of the defoaming effect. In view of further suppression of precipitation of the defoaming agent to further improve the lifetime of the defoaming agent, this weight average molecular weight is preferably no more than 500,000, more preferably no more than 250,000, further preferably no more than 150,000, and particularly preferably no more than 100,000. In one embodiment, this weight average molecular weight may be 500 to 500,000, or 5,000 to 250,000, or 10,000 to 150,000, or 10,000 to 100,000.

When copolymerizing the first monomer component and the second monomer component, the amount of the first monomer component on the basis of the total amount of the first and second monomer components (100 parts by mass) is preferably no less than 0.5 parts by mass, more preferably no less than 1 part by mass, further preferably no less than 2 parts by mass, and especially preferably no less than 4 parts by mass in view of further improvement of the defoaming effect. In view of further suppression of precipitation of the defoaming agent to further improve the lifetime of the defoaming agent, this amount is preferably no more than 80 parts by mass, more preferably no more than 75 parts by mass, and further preferably no more than 70 parts by mass. In one embodiment, this amount may be 0.5 to 80 parts by mass, or 1 to 75 parts by mass, or 2 to 75 parts by mass, or 4 to 70 parts by mass. Corresponding to this, the polymer (A2) may comprise the repeating units derived from the first monomer component preferably in an amount of 0.5 to 80 mass %, more preferably in an amount of 1 to 75 mass %, further preferably in an amount of 2 to 75 mass %, and particularly preferably in an amount of 4 to 70 mass % on the basis of the total mass of the polymer (A2).

When copolymerizing the first monomer component and the second monomer component, the amount of the second monomer component on the basis of the total amount of the first and second monomer components (100 parts by mass) is preferably no less than 20 parts by mass, more preferably no less than 25 parts by mass, and further preferably no less than 30 parts by mass in view of further suppression of precipitation of the defoaming agent to further improve the lifetime of the defoaming agent. In view of further improvement of the defoaming effect, this amount is preferably no more than 99.5 parts by mass, more preferably no more than 99 parts by mass, further preferably no more than 98 parts by mass, and particularly preferably no more than 96 parts by mass. In one embodiment, this amount may be 20 to 99.5 parts by mass, or 25 to 99 parts by mass, or 25 to 98 parts by mass, or 30 to 96 parts by mass. Corresponding to this, the polymer (A2) may comprise the repeating units derived from the second monomer component preferably in an amount of 20 to 99.5 mass %, more preferably in an amount of 25 to 99 mass %, further preferably in an amount of 25 to 98 mass %, and particularly preferably in an amount of 30 to 96 mass % on the basis of the total mass of the polymer (A2).

The weight average molecular weight of the polymer (A2) obtained by copolymerization of the first and second monomer components is preferably no less than 10,000, more preferably no less than 12,000, further preferably no less than 14,000, especially preferably no less than 15,000, and in one embodiment, no less than 80,000 in view of further improvement of the defoaming effect. In view of easy avoidance of deterioration of the defoaming effect induced by the increase of the viscosity of the defoaming agent, this weight average molecular weight is preferably no more than 1,000,000, more preferably no more than 500,000, further preferably no more than 400,000, and especially preferably no more than 300,000. In one embodiment, this weight average molecular weight may be 10,000 to 1,000,000, or 12,000 to 500,000, or 14,000 to 400,000, or 15,000 to 300,000, or 80,000 to 300,000.

In one embodiment, the (A1) first defoaming agent may be obtained by copolymerization of (meth)acrylic acid derivatives. In such an embodiment, $X^1$ to $X^4$ are repeating units obtainable by polymerization of (meth)acryloyl group. In the present description, "(meth)acryl" means acryl and/or methacryl, and "(meth)acryloyl" means acryloyl and/or methacryloyl. The repeating units $X^1$ to $X^4$ obtainable by polymerization of (meth)acryloyl group are represented by the following general formula (16). In such an embodiment, the polymerizable functional groups $Q^4$ to $Q^8$ giving the repeating units $X^1$ to $X^4$ are represented by the following general formula (17).

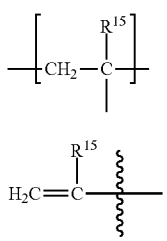

(16)

(17)

In the general formulae (16) and (17), $R^{15}$ represents a hydrogen atom or a methyl group; and one remaining valence of the carbon atom bonded to $R^{15}$ is bonded to carbonyl group. A plurality of $R^{15}$ may be all the same to, or may be different from each other.)

In such an embodiment, the repeating unit represented by the general formula (2) is preferably represented by the following general formula (18). In such an embodiment, the linking group $Z^1$ in the general formula (2) is —CO-$A^1$- group, and one remaining valence of the carbonyl group is bonded to the repeating unit $X^1$.

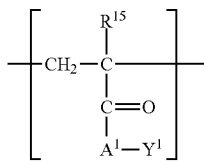

(18)

In the general formula (18), $R^{15}$ represents a hydrogen atom or a methyl group; $Y^1$ is as described above; and $A^1$ is —O— group, —NH— group, or —S— group.

The monomer represented by the general formula (9), which gives the repeating unit represented by the general formula (18), is preferably represented by the following general formula (19). In such an embodiment, the linking group $Z^8$ in the general formula (9) is —CO-$A^1$- group, and one remaining valence of the carbonyl group is bonded to the polymerizable functional group $Q^8$.

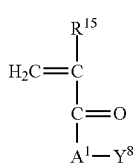

(19)

In the general formula (19), $R^{15}$, $A^1$, and $Y^8$ are as described above.

In such embodiment that the (A1) first defoaming agent is obtained by copolymerization of (meth)acrylic acid derivatives, for example, the groups surrounded by the dashed lines in the following general formulae (20) to (22) may be preferably employed as the linking groups $Z^2$ to $Z^7$ in the general formulae (3) to (8). For the sake of clarity of the directions of linking groups, the polymerizable functional group of the general formula (17) and the polysiloxane structure of the general formula (1) are shown together in the following general formulae (20) to (22). The linking groups in the following general formulae (20) to (22) are, though, applicable as any of the linking groups $Z^2$ to $Z^7$ in the general formulae (3) to (8). In the following general formulae (20) to (22), one remaining valence of the carbonyl group of the linking group is bonded to any of the polymerizable functional groups ($Q^4$ to $Q^7$) of the general formula (17), and another remaining valence of the linking group is bonded to a terminal oxygen atom of the polysiloxane structure (the general formula (1)).

(20)

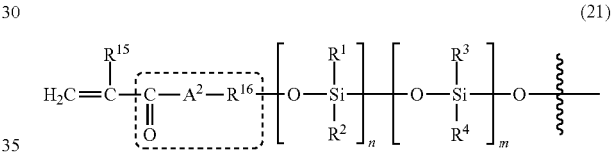

(21)

In the general formula (21), $A^2$ is —O— group, —NH— group, or —S— group; $R^{16}$ is a linear or branched chain alkylene group, a cycloalkylene group, or an arylene group; the carbon number of $R^{16}$ is usually 2 to 30, preferably no less than 3, preferably no more than 24, and more preferably no more than 18.

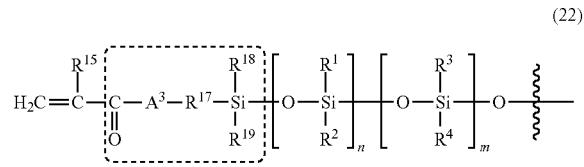

(22)

In the general formula (22), $A^3$ is —O— group, —NH— group, or —S— group; $R^{17}$ is a linear or branched chain alkylene group, a cycloalkylene group, or an arylene group; the carbon number of $R^{17}$ is usually 2 to 30, preferably 3 to 24, and more preferably 3 to 18; $R^{18}$ and $R^{19}$ are each independently a C1-18 organic group comprising no fluorine atom.

In the general formula (22), concerning $R^{18}$ and $R^{19}$, the same group as described above concerning $R^1$ and $R^2$ may be employed as "$C_{1-18}$ organic group comprising no fluorine atom", and preferred examples thereof are also the same as described above.

Among the linking groups in the general formulae (20) to (22), any linking group in the general formula (21) or (22) may be more preferably employed and any linking group in the general formula (22) may be especially preferably employed as the linking groups $Z^2$ to $Z^7$ in the general formulae (3) to (8).

(Production)

A way of producing the (A) first defoaming agent is not specifically restricted. For example, the (A) first defoaming agent may be preferably produced by copolymerizing the above-explained first and second monomer components (the above described polymer (A2)). For another example, the above described polymer (A1) may be obtained by first building a main chain skeleton by polymerization reaction, and thereafter introducing the polysiloxane structure via the linking group by reacting the resultant reaction product with a compound having a polysiloxane structure of a desired polymerization degree (the general formula (1)). In the polymerization reaction, any known way such as mass polymerization and solution polymerization may be used without any limitation. Among them, solution polymerization may be preferably employed. Any known polymerization initiator such as an azo initiator and a peroxide initiator may be used as a polymerization initiator without specific limitation. Any known polymerization solvent as follows may be used without specific limitation: aliphatic hydrocarbons (such as hexane, heptane, octane, decane, cyclohexane, and methylcyclohexane), aromatic hydrocarbons (such as benzene, toluene, and xylene), ketones (such as acetone, methyl ethyl ketone, methyl isobutyl ketone, and diisobutyl ketone), esters (such as ethyl acetate, isopropyl acetate, butyl acetate, isobutyl acetate, amyl acetate, isopropyl laurate, isopropyl palmitate, and isopropyl myristate), ethers (such as diethyl ether, diisopropyl ether, tert-butyl methyl ether, dihexyl ether, dimethyl cellosolve, and dioxane), halogenated hydrocarbons (such as tetrachloromethane, chloroform, fluorothene (1,1,1-trifluoroethane), perchloroethylene, ethylene dichloride, dichloromethane, dichloroethane, trichloroethane, tetrachloroethane, chlorobenzene, dichlorobenzene, chrorofluoromethanes (the substitution numbers of chlorine atom(s) and fluorine atom(s) may be any of at least 1 respectively, as long as the total number thereof is no more than 4), chlorofluoroethanes (the substitution numbers of chlorine atom(s) and fluorine atom(s) may be any of at least 1 respectively, as long as the total number thereof is no more than 6, and the chlorine atom(s) and the fluorine atom(s) may be in any position)), and aliphatic alcohols (such as butanol, 2-ethylhexanol, and lauryl alcohol). Among them, an aliphatic or aromatic hydrocarbon solvent having 6 to 10 carbons, or aliphatic ketone solvents may be especially preferably used, and in one embodiment, methyl isobutyl ketone may be especially preferably used. A polymer having a desired weight average molecular weight may be obtained by adjusting monomer concentration, initiator concentration, reaction temperature, and reaction time in the solvent polymerization.

(1.2.3 Producing Polymer (A1) (2))

In another embodiment, the polymer (A1) is obtainable by a process, the process comprising the step of: polymerizing (b) at least one defoaming agent monomer comprising at least one polysiloxane macromonomer selected from the compounds represented by the following general formula (10) or (11) (hereinafter may be referred to as "defoaming agent monomer (b)" or simply "component (b)") in (a) a polymerization solvent (hereinafter may be simply referred to as "component (a)") under coexistence of (c) a polymer soluble in the polymerization solvent (hereinafter may be referred to as "coexisting polymer (c)" or simply "component (c)"):

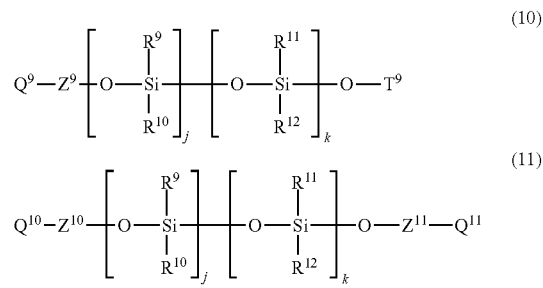

In the general formulae (10) and (11), the polysiloxane repeating units may be in any order; $R^9$ and $R^{10}$ are each independently a $C_{1-18}$ organic group comprising no fluorine atom; $R^{11}$ and $R^{12}$ are each independently an organic group comprising at least three fluorine atoms or a C1-18 organic group comprising no fluorine atom, wherein at least one of $R^{11}$ and $R^{12}$ is the organic group comprising at least three fluorine atoms; $Q^9$, $Q^{10}$, and $Q^{11}$ are each independently a polymerizable functional group comprising an ethylenically unsaturated group; $Z^9$ is a linking group linking the polymerizable functional group $Q^9$ and the polysiloxane moiety; $Z^{10}$ is a linking group linking the polymerizable functional group $Q^{10}$ and the polysiloxane moiety; $Z^{11}$ is a linking group linking the polymerizable functional group $Q^{11}$ and the polysiloxane moiety; $T^9$ is a non-polymerizable organic group; j is an integer of 0 or more; k is an integer of 1 or more; and j+k is 5 to 2000.

(Polymerization System)

Any known polymerization system in which polymerization is conducted in a solvent may be employed, and radical polymerization, may be preferably employed as a polymerization system. Examples of polymerization systems that may be employed include: dispersion polymerization, suspension polymerization, miniemulsion polymerization, microemulsion polymerization, emulsion polymerization, and solution polymerization. Among them, dispersion polymerization and solution polymerization may be especially preferably employed. Examples of radical polymerization include conventional radical polymerization, and living radical polymerization. Conventional radical polymerization may be preferably employed.

((a) Polymerization Solvent)

A solvent suitable for the employed polymerization system may be suitably selected as the polymerization solvent from solvents which can dissolve the coexisting polymer (c) (described later), and preferably solvents which can dissolve the defoaming agent monomer (b) and the coexisting polymer (c).

((b) Defoaming Agent Monomer)

A radical polymerizable defoaming agent monomer may be preferably used, and a radical polymerizable monomer having at least one radical polymerizable ethylenically unsaturated group may be especially preferably used as the defoaming agent monomer. The defoaming agent monomer (b) comprises at least one polysiloxane macromonomer selected from the compounds represented by the general formula (10) or (11). Using such a radical polymerizable macromonomer gives the obtained defoaming agent polymer good defoaming effect. One compound represented by the general formula (10) may be used alone, or two or more compounds represented by the general formula (10) may be used in combination. One compound represented by the general formula (11) may be used alone, or two or more compounds represented by the general formula (11) may be used in combination. As the polysiloxane macromonomer, any compound represented by the general formula (10) may be used alone, or any compound represented by the general formula (11) may be used alone, or the compounds represented by the general formulae (10) and (11) respectively may be used in combination.

In the general formulae (10) and (11), $Q^9$ to $Q^{11}$ may be each independently a combination of at least two polymerizable functional groups; $Z^9$ to $Z^{11}$ may be each independently a combination of at least two linking groups; and $T^9$ may be a combination of at least two organic groups.

In the general formulae (10) and (11), the same group as described above concerning $Q^5$ to $Q^7$ in the general formulae (7) and (8) may be employed as $Q^9$ to $Q^{11}$, and preferred examples thereof are also the same as described above.

In the general formulae (10) and (11), the same group as described above concerning $Z^5$ to $Z^7$ in the general formulae (7) and (8) may be employed as $Z^9$ to $Z^{11}$, and preferred examples thereof are also the same as described above.

In the general formula (10), the same group as described above concerning $T^5$ in the general formula (7), that is, the same group as described above concerning $T^2$ in the general formula (3) may be employed as $T^9$, and preferred examples thereof are also the same as described above.

In the general formulae (10) and (11), the polysiloxane repeating units may be arranged in any order. In the general formulae (10) and (11), when j and k are each no less than 1, the polysiloxane structure may be a random copolymer, or may be an alternating copolymer, or may be a block copolymer.

In the general formulae (10) and (11), preferred examples of the polymerization degree of the polysiloxane structure (j+k) are the same as the polymerization degree of the polysiloxane structure (n+m: see the general formula (1)) described above concerning the first polymer chain.

In the defoaming agent monomer (b), the average fluorination ratio of the polysiloxane structure, that is, the ratio of the total number of the polysiloxane repeating units comprising fluorine atoms (—O—$SiR^{11}R^{12}$—) to the total number of all the polysiloxane repeating units (—O—$SiR^9R^{10}$— repeating unit and —O—$SiR^{11}R^{12}$— repeating unit) is usually 0.01 to 1, preferably no less than 0.05, more preferably no less than 0.10, and may be even 1 in view of improvement of the defoaming effect after shearing. In view of further suppression of precipitation of the defoaming agent to further improve the lifetime of the defoaming agent, this average fluorination ratio is preferably no more than 0.99, more preferably no more than 0.90, and further preferably no more than 0.75. In one embodiment, this average fluorination ratio may be 0.01 to 0.99, or 0.05 to 0.90, or 0.10 to 0.75.

In the general formulae (10) and (11), the groups same as those described above as the C1-18 organic group comprising no fluorine atom in the general formula (1) may be employed as C1-18 organic groups comprising no fluorine atom. Preferred examples thereof are also the same as described above.

In the general formulae (10) and (11), the groups same as those described above as the organic groups comprising at least three fluorine atoms (fluorinated organic groups) in the general formula (1) may be employed as organic groups comprising at least three fluorine atoms (fluorinated organic groups). Preferred examples thereof are also the same as described above.

The polysiloxane macromonomer has a weight average molecular weight of preferably no less than 500, more preferably no less than 5000, and further preferably no less than 10,000 in view of further improvement of the defoaming effect. In view of further suppression of precipitation of the defoaming agent to further improve the lifetime of the defoaming agent, this weight average molecular weight is preferably no more than 500,000, more preferably no more than 250,000, further preferably no more than 150,000, and particularly preferably no more than 100,000. In one embodiment, this weight average molecular weight may be 500 to 500,000, or 5,000 to 250,000, or 10,000 to 150,000, or 10,000 to 100,000.

As the defoaming agent monomer, the polysiloxane macromonomer may be used alone, or may be used in combination with any other radical polymerizable monomer as long as the defoaming effect is not impaired. One example of any other radical polymerizable monomer to be copolymerized with the polysiloxane macromonomer is the monomer represented by the following general formula (23) (hereinafter may be referred to as "fluorinated monomer"):

$$Q^{12}\text{-}Z^{12}\text{—}Y^{12} \qquad (23)$$

In the general formula (23), $Q^{12}$ is a polymerizable functional group comprising an ethylenically unsaturated group; $Y^{12}$ is an organic group comprising at least three fluorine atoms; and $Z^{12}$ is a linking group linking $Q^{12}$ and $Y^{12}$.)

In the general formula (23), $Q^{12}$ may be a combination of at least two polymerizable functional groups; $Z^{12}$ may be a combination of at least two linking groups; $Y^{12}$ may be a combination of at least two organic groups.

In the general formula (23), the same group as described above concerning $Q^8$ in the general formula (9) may be employed as $Q^{12}$, and preferred examples thereof are also the same as described above.

In the general formula (23), the same group as described above concerning $Z^8$ in the general formula (9) may be employed as $Z^{12}$, and preferred examples thereof are also the same as described above.

Concerning $Y^{12}$ in the general formula (23), the same group as described above as the organic group comprising at least three fluorine atoms in the general formula (1) may be employed as the organic group comprising at least three fluorine atoms, and preferred examples thereof are also the same as described above.

Another example of any other radical polymerizable monomer to be copolymerized with the polysiloxane macromonomer is a monomer represented by the following general formula (24):

$$Q^{13}\text{-}Z^{13}\text{—}Y^{13} \qquad (24)$$

in the general formula (24), $Q^{13}$ is a polymerizable functional group comprising an ethylenically unsaturated group; $Y^{13}$ is a substituted or unsubstituted C1-40 hydrocarbyl group; and $Z^{13}$ is a linking group linking $Q^{13}$ and $Y^{13}$.

In the general formula (24), $Q^{13}$ may be a combination of at least two polymerizable functional groups; $Z^{13}$ may be a combination of at least two linking groups; and $Y^{13}$ may be a combination of at least two hydrocarbyl groups.

In the general formula (24), the same group as described above concerning $Q^8$ in the general formula (9) may be employed as $Q^{13}$, and preferred examples thereof are also the same as described above.

In the general formula (24), the same group as described above concerning $Z^8$ in the general formula (9) may be employed as $Z^{13}$, and preferred examples thereof are also the same as described above.

Concerning $Y^{13}$ in the general formula (24), the same group as described above concerning $Y^8$ in the general formula (9) may be employed as the substituted or unsubstituted C1-40 hydrocarbyl group, and preferred examples thereof are also the same as described above.

Other examples of any other radical polymerizable monomer to be copolymerized with the polysiloxane macromonomer include: styrene, (meth)acrylonitrile, vinylpyridine, vinyl acetate, and vinyl halides.

A multifunctional monomer having two or more radical polymerizable functional groups in one molecule may be also used as another radical polymerizable monomer to be copolymerized with the polysiloxane macromonomer. Such a multifunctional monomer may be used together with the above described monofunctional radical polymerizable monomer. Addition of a multifunctional monomer to the polymerization system makes it possible to control the particle size of the obtained defoaming agent polymer. Multifunctional monomers that may be used in the present invention are not particularly restricted as long as being soluble in the polymerization solvent, and examples thereof include: esters of (meth)acrylic acid and C2-12 alkyl alcohols, C2-12 alicyclic alkyl alcohols, or C2-12 aromatic multifunctional alcohols, such as ethylene glycol di(meth)acrylate, trimethylolpropane tri(meth)acrylate, and pentaerythritol tetra(meth)acrylate; di(meth)acrylates of poly (or oligo) alkylene glycols; and divinyl benzene.

The proportion of the polysiloxane macromonomer (the general formula (10) and/or (11)) in the defoaming agent monomer is preferably no less than 10 mass %, more preferably no less than 50 mass %, further preferably no less than 65 mass %, and especially preferably no less than 70 mass %, and may be even 100 mass % on the basis of the total mass of the defoaming agent monomer (100 mass %).

In view of improvement of the defoaming effect, the proportion of the fluorinated monomer to the defoaming agent monomer on the basis of the total mass of the defoaming agent monomer (100 mass %) is preferably no more than 50 mass %, more preferably no more than 35 mass %, and further preferably no more than 30 mass %. The lower limit of this proportion is not restricted, but may be even 0 mass % in one embodiment, may be 2 to 50 mass % in another embodiment, may be 5 to 35 mass % in another embodiment, and may be 5 to 30 mass % in another embodiment.

((c) Coexisting Polymer)

Examples of the coexisting polymer include: non-dispersant poly(alkyl (meth)acrylate)s; dispersant poly(alkyl (meth)acrylate)s having a polar group such as hydroxy group, amino group, or amide group in their side chains (the polar group may be introduced by random copolymerization or block copolymerization); comb-shaped poly(alkyl (meth)acrylate)s having polyisobutylene in their side chains, or having a hydrogenated product of polybutadiene or polyisoprene in their side chains; star-shaped poly(alkyl (meth)acrylate)s having a core moiety, and three or more arm moieties (branch moieties) bonded to the core moiety; olefin copolymers; hydrogenated products of styrene-diene copolymers; hydrogenated products of polyisoprene; polyisobutylene; maleated polyisobutylene; imidated products of maleated polyisobutylene; hydrogenated polybutadiene; oil-soluble polyester; long-chain alkyl modified silicone; and EPDM (ethylene-propylene-diene rubber). The coexisting polymer may be suitably selected by the skilled person according to a specific polymerization solvent and polymerization system. In one preferred embodiment, the coexisting polymer comprises the repeating unit represented by the general formula (2).

(Polymerization Conditions)

Reaction conditions of the polymerization reaction may be suitably determined by the skilled person according to the employed polymerization system, polymerization solvent, defoaming agent monomer, and coexisting monomer.

Upon polymerization, the amount of the polysiloxane macromonomer on the basis of the total amount of the defoaming agent monomer (b) and the coexisting polymer (c) (100 parts by mass) is preferably no less than 0.5 parts by mass, more preferably no less than 1 part by mass, further preferably no less than 2 parts by mass, and especially preferably no less than 4 parts by mass in view of further improvement of the defoaming effect. In view of further suppression of precipitation of the defoaming agent to further improve the lifetime of the defoaming agent, this amount is preferably no more than 80 parts by mass, more preferably no more than 50 parts by mass, further preferably no more than 30 parts by mass, and especially preferably no more than 20 parts by mass. In one embodiment, this amount may be 0.5 to 80 parts by mass, or 1 to 50 parts by mass, or 2 to 30 parts by mass, or 4 to 20 parts by mass.

(Defoaming Agent Particles)

A dispersion of defoaming agent particles can be obtained when the polymerization reaction is completed in the above described various polymerization systems where polymerization is conducted in a solvent, except in solution polymerization. The average particle size of the defoaming agent particles after polymerization (average particle size obtained by dynamic light scattering and cumulant analysis) is preferably no more than 10 μm, more preferably no more than 5 μm, and further preferably no more than 2 μm in view of further suppression of segregation and precipitation of the defoaming agent and in view of further improvement of the defoaming effect. The lower limit thereof is not restricted, but for example, may be no less than 0.05 μm.

(1.2.3.1 Dispersion Polymerization)

In one preferred embodiment, the polymer (A1) is obtained by dispersion polymerization. In dispersion polymerization, the (c) polymer soluble in the polymerization solvent (coexisting polymer) works as a polymer dispersant (c1).

In dispersion polymerization which is one embodiment of radical polymerization, polymerization of monomer is conducted under the presence of a polymer (polymer dispersant) dissolved in a solvent (polymerization solvent), such that on one hand, the monomer itself is soluble in the solvent, and on the other hand, a polymer formed by polymerization of the monomer is insoluble in the solvent. In dispersion polymerization, polymerization initiates in a uniform solution, and thereafter the system gradually becomes a suspension because of formation of nuclei of particles by the polymer segregated accompanying the progress of the polymerization reaction. At this time, the polymer which is segregated accompanying the progress of the polymerization reaction is dispersed and stabilized as fine particles by the polymer (polymer dispersant) which is soluble in the solvent and exists in the system from the beginning. The polymer finally obtained is in the form of fine particles stably dispersed in the solvent.

((a) Polymerization Solvent)

The polymerization solvent used in dispersion polymerization is such a solvent that on one hand, the defoaming agent monomer (b) itself (in the form of monomer) is soluble in the solvent, and on the other hand, the polymer formed by polymerization of the defoaming agent monomer (b) is insoluble in the solvent.

The polymerization solvent in dispersion polymerization is preferably a solvent comprising at least one selected from hydrocarbon solvents having no less than 6 carbons, mineral oils, synthetic oils, and ester oils. Specifically, when the defoaming agent according to the present invention is added to lubricating oil, a lubricant base oil such as a mineral oil and a synthetic oil is preferably used as the dispersion polymerization solvent.

((c1) Polymer Dispersant)

The polymer dispersant used in dispersion polymerization is not particularly restricted as long as it is soluble in the polymerization solvent, and is able to finely disperse the defoaming agent polymer after polymerization in the polymerization solvent. Examples of polymers that may be used as the polymer dispersant (c1) in dispersion polymerization include: non-dispersant poly(alkyl (meth)acrylate)s; dispersant poly(alkyl (meth)acrylate)s having a polar group such as hydroxy group, amino group, or amide group in their side chains (the polar group may be introduced by random copolymerization or block copolymerization); comb-shaped poly(alkyl (meth)acrylate)s having polyisobutylene in their side chains, or having a hydrogenated product of polybutadiene or polyisoprene in their side chains; star-shaped poly(alkyl (meth)acrylate)s having a core moiety, and three or more arm moieties (branch moieties) bonded to the core moiety; olefin copolymers; hydrogenated products of styrene-diene copolymer; hydrogenated products of polyisoprene; polyisobutylene; maleated polyisobutylene; imidated products of maleated polyisobutylene; hydrogenated polybutadiene; oil-soluble polyester; long-chain alkyl modified silicone; and EPDM (ethylene-propylene-diene rubber). In the present description, a "dispersant" poly(alkyl (meth)acrylate) means a poly(alkyl (meth)acrylate) having a polar group such as hydroxy group, amino group, or amide group in its side chain, and a "non-dispersant" poly(alkyl (meth)acrylate) means a poly(alkyl (meth)acrylate) not having such a polar group in its side chain. While incorporation of the former poly(alkyl (meth)acrylate) in lubricating oil gives detergent dispersant effect, detergent dispersant effect is not expected when the latter poly(alkyl (meth)acrylate) is incorporated in lubricating oil. Thus, in the technical field of lubricating oil, the former poly(alkyl (meth)acrylate) is referred to as a "dispersant" poly(alkyl (meth)acrylate), and the latter poly(alkyl (meth)acrylate) is referred to as a "non-dispersant" poly(alkyl (meth)acrylate). The present description also follows this terminology in the technical field of lubricating oil concerning poly(alkyl (meth)acrylate)s. It is, though, noted that in the present description, even a "non-dispersant" poly(alkyl (meth)acrylate) can work as a polymer dispersant in dispersion polymerization.

Among them, a poly(alkyl (meth)acrylate) having a weight average molecular weight of 10,000 to 1,000,000 may be preferably used as the polymer dispersant (c1) in dispersion polymerization. Particularly preferred examples of such a poly(alkyl (meth)acrylate) include poly(alkyl (meth)acrylate)s having a linear or branched chain C1-30 alkyl group. The poly(alkyl (meth)acrylate) may be of dispersant type, or may be of non-dispersant type. This poly(alkyl (meth)acrylate) may be a linear polymer, or may be a comb-shaped polymer, or may be a star-shaped polymer. When the poly(alkyl (meth)acrylate) is used as the polymer dispersant, the weight average molecular weight thereof is preferably no less than 10,000, and more preferably no less than 30,000 in view of improvement of the performance as the dispersant to make it easy to form the obtained defoaming agent into fine particles. In view of decrease of the viscosity of the reaction mixture during the dispersion polymerization to lead to easy stirring, this weight average molecular weight is preferably no more than 1,000,000. In one embodiment, this weight average molecular weight may be 10,000 to 1,000,000, or 30,000 to 1,000,000.

(Polymerization Conditions)

The concentration of the defoaming agent monomer (b) (concentration of all the monomers in total when at least two monomers are used) in the reaction mixture on the basis of the total mass of the reaction mixture (100 mass %) when dispersion polymerization initiates is preferably no less than 5 mass %, and more preferably no less than 7 mass % in view of enhancement of the polymerization rate to enhance the conversion ratio of the monomer to the polymer. In view of decrease in the average particle size of the obtained defoaming agent fine particles, this concentration is preferably no more than 50 mass %, more preferably no more than 30 mass %, and further preferably no more than 20 mass %. In one embodiment, this concentration may be 5 to 50 mass %, or 7 to 30 mass %, or 7 to 20 mass %.

The concentration of the polymer dispersant (c1) in dispersion polymerization on the basis of the total mass of the reaction mixture (100 mass %) is preferably no less than 0.1 mass %, and more preferably no less than 0.15 mass % in view of decrease in the average particle size of the defoaming agent fine particles. In view of improvement of solubility of the monomer and in view of decrease of the viscosity of the reaction mixture to lead to easy stirring, this concentration is preferably no more than 20 mass %. In one embodiment, this concentration may be 0.1 to 20 mass %, or 0.15 to 20 mass %.

Reaction temperature in dispersion polymerization may be suitably selected by the skilled person according to the used combination of the polymerization solvent, the defoaming agent monomer, the radical initiator, and the polymer dispersant, and the concentrations of the defoaming agent monomer and the polymer dispersant.

Any radical polymerization initiator soluble in the dispersion polymerization system at the polymerization temperature may be used without any limitation as a radical polymerization initiator for dispersion polymerization, and examples thereof include initiators such as organic peroxide initiators and azo compounds. The amount of the radical initiator on the basis of 100 parts by mass of the used monomer is preferably no less than 0.1 parts by mass, and more preferably no less than 1 part by mass in view of enhancement of the conversion ratio of the monomer to the polymer. In view of suppression of degradation of the defoaming effect due to residue of the radical initiator, this amount is preferably no more than 10 parts by mass. In one embodiment, this amount may be 0.1 to 10 parts by mass, or 1 to 10 parts by mass.

(Defoaming Agent Particles)

In the defoaming agent obtained by dispersion polymerization, the defoaming agent polymer is in the form of fine particles as a result of dispersion polymerization, which can suppress deterioration of the defoaming effect induced by segregation and precipitation of the defoaming agent particles. The average particle size of the defoaming agent particles obtained by dispersion polymerization (average particle size obtained by dynamic light scattering and cumulant analysis) is preferably no more than 10 μm, more preferably no more than 5 μm, and further preferably no more than 2 μm in view of further suppression of segregation and precipitation of the defoaming agent and in view of improvement of the defoaming effect. In one embodiment, this average particle size may be 0.05 to 10 μm, or 0.1 to 5 μm, or 0.3 to 2 μm. Dispersion polymerization makes it easy to have the average particle size of the defoaming agent particles of no more than 10 µm.

(1.2.3.2 Solution Polymerization)

In another preferred embodiment, the polymer (A1) is obtained by solution polymerization. In solution polymerization, a polymer after completion of polymerization reaction remains dissolved in the solvent. Solution radical polymerization is preferable as solution polymerization.

((a) Polymerization Solvent)

As the polymerization solvent in solution polymerization, any solvent which can dissolve the defoaming agent monomer (b) and the polymer formed by polymerization of the defoaming agent monomer may be used without particular limitation.

Preferred examples of the polymerization solvent in solution polymerization include: aliphatic hydrocarbons (such as hexane, heptane, octane, decane, cyclohexane, and methylcyclohexane), aromatic hydrocarbons (such as benzene, toluene, and xylene), ketones (such as acetone, methyl ethyl ketone, and methyl isobutyl ketone), esters (such as ethyl acetate, isopropyl acetate, butyl acetate, isobutyl acetate, amyl acetate, isopropyl laurate, isopropyl palmitate, and isopropyl myristate), ethers (such as diethyl ether, diisopropyl ether, tert-butyl methyl ether, dihexyl ether, dimethyl cellosolve, and dioxane), halogenated hydrocarbons (such as tetrachloromethane, chloroform, fluorothene (1,1,1-trifluoroethane), perchloroethylene, ethylene dichloride, dichloromethane, dichloroethane, trichloroethane, tetrachloroethane, chlorobenzene, dichlorobenzene, chrorofluoromethanes (the substitution numbers of chlorine atom(s) and fluorine atom(s) may be any of at least 1 respectively, as long as the total number thereof is no more than 4), chlorofluoroethanes (the substitution numbers of chlorine atom(s) and fluorine atom(s) may be any of at least 1 respectively, as long as the total number thereof is no more than 6, and the chlorine atom(s) and the fluorine atom(s) may be in any position)), aliphatic alcohols (such as butanol, 2-ethylhexanol, and lauryl alcohol), and mineral oils. Among them, an aliphatic or aromatic hydrocarbon solvent having 6 to 10 carbons, or aliphatic ketone solvents may be especially preferably used. One polymerization solvent may be used alone, or two or more polymerization solvents may be used in combination.

((c) Coexisting Polymer)

Examples of polymers that may be used as the coexisting polymer in solution polymerization include: non-dispersant poly(alkyl (meth)acrylate)s; dispersant poly(alkyl (meth)acrylate)s having a polar group such as hydroxy group, amino group, or amide group in their side chains (the polar group may be introduced by random copolymerization or block copolymerization); comb-shaped poly(alkyl (meth) acrylate)s having polyisobutylene in their side chains, or having a hydrogenated product of polybutadiene or polyisoprene in their side chains; star-shaped poly(alkyl (meth) acrylate)s having a core moiety, and three or more arm moieties (branch moieties) bonded to the core moiety; olefin copolymers; hydrogenated products of styrene-diene copolymer; hydrogenated products of polyisoprene; polyisobutylene; maleated polyisobutylene; imidated products of maleated polyisobutylene; hydrogenated polybutadiene; oil-soluble polyester; long-chain alkyl modified silicone; and EPDM (ethylene-diene-propylene rubber).

Among them, a poly(alkyl (meth)acrylate) may be preferably used as the coexisting polymer (c) in solution polymerization. Particularly preferred examples of a poly(alkyl (meth)acrylate) include poly(alkyl (meth)acrylate)s having a linear or branched chain C1-30 alkyl group. The poly(alkyl (meth)acrylate) may be of dispersant type, or may be of non-dispersant type. The poly(alkyl (meth)acrylate) may be a linear polymer, a comb-shaped polymer, or a star-shaped polymer.

The weight average molecular weight of the coexisting polymer (c) in solution polymerization is preferably no less than 10,000 and more preferably no less than 30,000 in view of further improvement of durability of the obtained defoaming agent polymer against centrifugal effect. This weight average molecular weight is preferably no more than 1,000,000 in view of decrease of the viscosity of the reaction mixture to lead to easy stirring. In one embodiment, this weight average molecular weight may be 10,000 to 1,000,000, or 30,000 to 1,000,000.

(Polymerization Conditions)

The concentration of the defoaming agent monomer (b) (concentration of all the monomers in total when at least two monomers are used) in the reaction mixture when solution polymerization initiates on the basis of the total mass of the reaction mixture (100 mass %) is preferably no less than 5 mass % and more preferably no less than 7 mass % in view of enhancement of the polymerization rate to enhance the conversion ratio of the monomer to the polymer. In view of further improvement of easy fine dispersion of the obtained defoaming agent polymer, this concentration is preferably no more than 50 mass %, more preferably no more than 30 mass %, and further preferably no more than 20 mass %. In one embodiment, this concentration may be 5 to 50 mass %, or 7 to 30 mass %, or 7 to 20 mass %.

The concentration of the coexisting polymer (c) in solution polymerization on the basis of the total mass of the reaction mixture (100 mass %) is preferably no less than 0.1 mass % and more preferably no less than 0.15 mass % in view of further improvement of easy fine dispersion of the obtained defoaming agent polymer. In view of improvement of solubility of the monomer and in view of decrease of the viscosity of the reaction mixture to lead to easy stirring, this concentration is preferably no more than 20 mass %. In one embodiment, this concentration may be 0.1 to 20 mass %, or 0.15 to 20 mass %.

The reaction temperature in solution polymerization may be suitably selected by the skilled person according to the used combination of the polymerization solvent, the defoaming agent monomer (b), the coexisting polymer (c), and the radical initiator, and the concentrations of the defoaming agent monomer (b) and the coexisting polymer (c).

Any radical polymerization initiator soluble in the reaction solution at the polymerization temperature may be used without any limitation as a radical polymerization initiator for solution polymerization, and examples thereof include initiators such as organic peroxide initiators and azo compounds. The amount of the radical initiator on the basis of 100 parts by mass of the used monomer is preferably no less than 0.1 parts by mass and more preferably no less than 1 part by mass in view of enhancement of the conversion ratio of the monomer to the polymer. In view of suppression of degradation of the defoaming effect due to residue of the radical initiator, this amount is preferably no more than 10 parts by mass. In one embodiment, this amount may be 0.1 to 10 parts by mass, or 1 to 10 parts by mass.

In the defoaming agent obtained by solution polymerization, the defoaming agent polymer has improved fine dispersibility as a result of solution polymerization under coexistence of the coexisting polymer (c). Thus, the defoaming agent polymer can be easily finely dispersed in a lubricating oil composition even by incorporating the defoaming agent into the lubricating oil composition in the same manner as that for conventional defoaming agents. Further, the defoaming agent polymer remains finely dispersed in a lubricating oil composition even after a long term, or after strong centrifugal effect is applied. Therefore, incorporation of the defoaming agent into a lubricating oil composition can suppress deterioration of the defoaming effect induced by segregation and precipitation of the defoaming agent.

Fine dispersibility of the defoaming agent obtained by solution polymerization can be evaluated by the average particle size of the defoaming agent particles in a dispersion comprising the defoaming agent. The average particle size (average particle size obtained by dynamic light scattering and cumulant analysis) of the defoaming agent particles in a dispersion (at 25° C.) obtained by adding 1 mL of the solution after solution polymerization, which comprises the defoaming agent, to 10 mL of a mineral oil, followed by sufficient stirring, to make the defoaming agent finely dispersed, is preferably no more than 10 μm, more preferably no more than 5 μm, and further preferably no more than 2 μm in view of further suppression of segregation and precipitation of the defoaming agent and in view of improvement of the defoaming effect. In one embodiment, this average particle size may be 0.05 to 10 μm, or 0.1 to 5 μm, or 0.3 to 2 μm. For example, YUBASE™ 4 manufactured by SK Lubricants Co., Ltd. (kinematic viscosity (100° C.): 4.2 mm²/s, kinematic viscosity (40° C.): 19.4 mm²/s, viscosity index: 125) may be preferably used as the mineral oil for measurement of the average particle size. Preferably, the above described stirring may be carried out in a 100 mL beaker using a columnar magnetic stir bar made from PTFE of 8 mm in diameter and 30 mm in length at ambient temperature at 200 rpm for 30 minutes. For example, a dynamic light scattering measurement device, Photal ELSZ-2000S (manufactured by Otsuka Electronics Co., Ltd.) may be preferably used for measurement of the average particle size by dynamic light scattering. The defoaming agent obtained by solution polymerization makes it easy to obtain a dispersion comprising the defoaming agent particles having an average particle size of no more than 10 μm, and no special operation other than stirring is necessary for obtaining such a dispersion.

(1.3 (B) Second Defoaming Agent)

The second defoaming agent is a silicone defoaming agent which has a polysiloxane structure and does not fall under the first defoaming agent. As the second defoaming agent, one of silicone defoaming agents each having a linear or branched polysiloxane structure, the polysiloxane structure comprising a repeating unit represented by the following general formula (25) may be used alone, or two or more thereof may be used in combination:

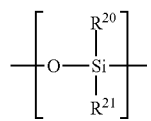

(25)

In the formula (25), $R^{20}$ and $R^{21}$ are each independently a C1-18 organic group or combination of two or more C1-18 organic groups.

The polysiloxane structure in the second defoaming agent may be linear or branched. A linear polysiloxane structure for the second defoaming agent means the structure represented by the following general formula (26):

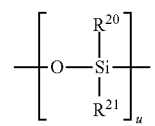

(26)

In the formula (26), $R^{20}$ and $R^{21}$ are as previously defined, and m represents a polymerization degree.

The branched polysiloxane structure in the second defoaming agent is obtainable by replacing $R^{20}$ and/or $R^{21}$ on the Si atom in one or more repeating units represented by the general formula (26) with a polysiloxane side chain comprising the repeating unit represented by the general formula (25). In the branched polysiloxane structure, the polysiloxane side chain may further comprise one or more branches. The polymerization degree of the polysiloxane structure equals to the total number of the Si atoms thereof.

In the general formulae (25) and (26), examples of organic groups having 1 to 18 carbons include: substituted or unsubstituted alkyl groups, substituted or unsubstituted phenyl groups, fluoroalkyl groups, and polyether groups. Examples of substituents in substituted alkyl groups and substituted phenyl groups include hydroxy group, amino group, ether bond, and ester bond. The carbon numbers of $R^{20}$ and $R^{21}$ are 1 to 18; and in one embodiment, may be 1 to 12; and in another embodiment, may be 1 to 6. Preferred examples of the organic groups include: methyl group, phenyl group, and fluoroalkyl groups. Among them, a methyl group or a fluoroalkyl group may be especially preferably employed.

A chain terminal of the polysiloxane structure in the second defoaming agent may be bonded with, for example, the same group as $R^{20}$ or $R^{21}$ in the formulae (25) and (26), a C1-12 hydrocarbyl group, a C1-12 monovalent organic group having one or more functional groups (such as hydroxy group, amino group, ether bond, ester bond, and amide bond), or a hydroxy group.

The polymerization degree of the polysiloxane structure in the silicone defoaming agent comprising no fluorinated organic group is preferably no less than 300, more preferably no less than 500, and further preferably no less than 1,000 in view of further improvement of the defoaming effect. This polymerization degree is preferably no more than 3,000 in view of decrease of the viscosity to improve dispersibility, to further improve the lifetime of the defoaming agent. In one embodiment, this polymerization degree may be 300 to 3,000, or 500 to 3,000, or 1,000 to 3,000.

The weight average molecular weight of the silicone defoaming agent comprising no fluorinated organic group is preferably no less than 30,000, more preferably no less than 50,000, and further preferably no less than 90,000 in view of further improvement of the defoaming effect. This weight average molecular weight is preferably no more than 500,000 and more preferably no more than 300,000 in view of decrease of the viscosity to improve dispersibility, to further improve the lifetime of the defoaming agent. In one embodiment, this weight average molecular weight may be 30,000 to 500,000, or 50,000 to 300,000, or 90,000 to 300,000.

As the second defoaming agent, a fluorosilicone defoaming agent may be particularly preferably used. As the fluorosilicone defoaming agent, the above described silicone defoaming agent having a polysiloxane structure represented by the following general formula (27) may be preferably used:

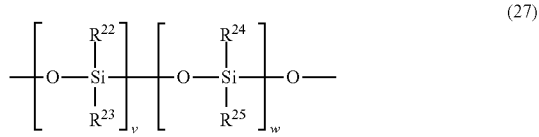

(27)

In the general formula (27), the polysiloxane repeating units may be in any order; $R^{22}$ and $R^{23}$ are each independently a C1-18 organic group comprising no fluorine atom; $R^{24}$ and $R^{25}$ are each independently an organic group comprising at least three fluorine atoms, or a C1-18 organic group comprising no fluorine atom, wherein at least one of $R^{24}$ and $R^{25}$ is the organic group comprising at least three fluorine atoms; v is an integer of 0 or more; w is an integer of 1 or more; and v+w is 50 to 1000.

The polymerization degree of the polysiloxane structure in the fluorosilicone defoaming agent is preferably no less than 100, and in one embodiment no less than 150 in view of further improvement of the defoaming effect. This polymerization degree is preferably no more than 1000, and in one embodiment no more than 550 in view of decrease of the viscosity to improve dispersibility, to further improve the lifetime of the defoaming agent. In one embodiment, this polymerization degree may be 100 to 1000, or 150 to 550.

The weight average molecular weight of the fluorosilicone defoaming agent is preferably no less than 15,000, more preferably no less than 20,000, and further preferably no less than 25,000 in view of further improvement of the defoaming effect. This weight average molecular weight is preferably no more than 150,000, more preferably no more than 100,000, and further preferably no more than 85,000 in view of decrease of the viscosity to improve dispersibility, to further improve the lifetime of the defoaming agent. In one embodiment, this weight average molecular weight may be 15,000 to 150,000, or 20,000 to 100,000, or 25,000 to 85,000.

In the fluorosilicone defoaming agent, the ratio (w/(v+w)) of the total number (w) of the polysiloxane repeating units comprising fluorine atoms (—O—$SiR^{24}R^{25}$—) to the total number (v+w) of all the polysiloxane repeating units (—O—$SiR^{22}R^{23}$— repeating unit and —O—$SiR^{24}R^{25}$— repeating unit: see the general formula (27)) (average fluorination ratio of the polysiloxane structure) is usually 0.01 to 1, preferably no less than 0.05, and more preferably no less than 0.10 in view of further improvement of the defoaming effect after shearing. In one embodiment, this ratio may be 0.01 to 1, or 0.05 to 1, or 0.10 to 1.

In the general formula (27), examples of the C1-18 organic group comprising no fluorine atom include: substituted or unsubstituted alkyl groups, substituted or unsubstituted phenyl groups, and polyether groups. Examples of substituents in the substituted alkyl groups and substituted phenyl groups include: hydroxy group, amino group, ether bond, and ester bond. The carbon number of the organic group is 1 to 18, and in one embodiment 1 to 12, and in another embodiment 1 to 6. Preferred examples of the organic group include: methyl group and phenyl group. Among them, methyl group may be especially preferably employed.

In the general formula (27), a fluoroalkyl group or a fluoroalkyl (poly)ether group may be preferably employed as the organic group comprising at least three fluorine atoms (fluorinated organic group).

The number of fluorine atoms in the fluorinated organic group is at least three in view of improvement of the defoaming effect. This number is preferably no more than 17 in view of easy avoidance of degradation of the deforming effect induced by solidification of the polymer.

The same group as that of the fluoroalkyl group described above concerning $Y^1$ in the general formula (2) may be employed as the fluoroalkyl group, and preferred examples thereof are also the same as described above. The same group as that of the fluoroalkyl (poly)ether group described above concerning $Y^1$ in the general formula (2) may be employed as the fluoroalkyl (poly)ether group, and preferred examples thereof are also the same as described above.

Among the above groups, any group represented by the general formula (13) may be especially preferably employed as the fluorinated organic group.

(1.4 Content)

The content of the first defoaming agent in the lubricating oil composition according to the present invention in terms of silicon on the basis of the total mass of the composition is preferably no less than 0.1 mass ppm in view of further improvement of the defoaming effect. This content is preferably no more than 150 mass ppm, more preferably no more than 100 mass ppm, and in one embodiment, no more than 50 mass ppm in view of further suppression of precipitation of the defoaming agent to further improve the lifetime of the defoaming agent. In one embodiment, this content may be 0.1 to 150 mass ppm, or 0.1 to 100 mass ppm, or 0.1 to 50 mass ppm. In the present description, the silicon content in an oil shall be measured by inductively coupled plasma atomic emission spectroscopy (intensity ratio method (internal standard method)), conforming to JIS K0116.

The content of the second defoaming agent in the lubricating oil composition according to the present invention in terms of silicon on the basis of the total mass of the composition is preferably no less than 0.1 mass ppm in view of further improvement of the defoaming effect. This content is preferably no more than 150 mass ppm, more preferably no more than 100 mass ppm, and in one embodiment, no more than 50 mass ppm in view of further suppression of precipitation of the defoaming agent to further improve the lifetime of the defoaming agent. In one embodiment, this content may be 0.1 to 150 mass ppm, or 0.1 to 100 mass ppm, or 0.1 to 50 mass ppm.

The total content of the first and second defoaming agents in the lubricating oil composition according to the present invention in terms of silicon on the basis of the total mass of the composition is preferably no less than 0.2 mass ppm in view of further improvement of the defoaming effect. This total content is preferably no more than 300 mass ppm, more preferably no more than 200 mass ppm, and in one embodiment, no more than 100 mass ppm in view of further suppression of precipitation of the defoaming agent to further improve the lifetime of the defoaming agent. In one embodiment, this content may be 0.2 to 300 mass ppm, or 0.2 to 200 mass ppm, or 0.2 to 100 mass ppm.

The ratio (A/B) of the amount of the (A) first defoaming agent in terms of silicon to the amount of the (B) second defoaming agent in terms of silicon is preferably no less than 0.01 and more preferably no less than 0.1 in view of further suppression of precipitation of the defoaming agent to further improve the lifetime of the defoaming agent. This ratio is preferably no more than 100, more preferably no more than 10, and further preferably no more than 2 in view of further improvement of the defoaming effect. In one embodiment, this ratio may be 0.01 to 100, or 0.1 to 10, or 0.1 to 2.

(1.5 Other Additives)

The lubricating oil composition according to the present invention may further comprise at least one additive selected from (C) ashless dispersants, (D) antioxidants, (E) friction modifiers, (F) anti-wear agents or extreme-pressure agents, (G) metallic detergents, (H) viscosity index improvers or pour point depressants, (I) corrosion inhibitors, (J) anti-rust agents, (K) metal deactivators, (L) demulsifiers, (M) defoaming agents other than the first or second defoaming agent, and (N) coloring agents, in addition to the above described lubricating base oils, the (A) first defoaming agent, and the (B) second defoaming agent.

Any known ashless dispersant such as succinimide ashless dispersants may be used as (C) ashless dispersants, and examples thereof include: polybutenylsuccinimides having a polybutenyl group, the polybutenyl group having a number average molecular weight of 900 to 3500; polybutenylbenzylamines; polybutenylamines; and derivatives thereof (such as boric acid-modified products).

When the lubricating oil composition according to the present invention comprises an ashless dispersant, the content thereof is normally no less than 0.01 mass %, preferably no less than 0.1 mass %, normally no more than 20 mass %, and preferably no more than 10 mass % on the basis of the total mass of the lubricating oil composition.

Any known antioxidant such as phenolic antioxidants and amine antioxidants may be used as (D) antioxidants, and examples hereof include amine antioxidants such as alkylated diphenylamines, phenyl-α-naphthylamine, and alkylated α-naphthylamines; and phenolic antioxidants such as 2,6-di-tert-butyl-4-methylphenol, 4,4'-methylenebis(2,6-di-tert-butylphenol).

When the lubricating oil composition according to the present invention comprises an antioxidant, the content thereof is normally no more than 5.0 mass %, preferably no more than 3.0 mass %, preferably no less than 0.1 mass %, and more preferably no less than 0.5 mass % on the basis of the total mass of the lubricating oil composition.

Any known friction modifier may be used as (E) friction modifiers, and examples thereof include: aliphatic acid esters; aliphatic acid amides; phosphorus compounds such as phosphate esters, phosphite esters, and thiophosphate esters; organic molybdenum compounds such as MoDTP and MoDTC; organic zinc compounds such as ZnDTP; organic boron compounds such as alkylmercaptyl borates; graphite; molybdenum disulfide; antimony sulfide; boron compounds; and polytetrafluoroethylene.

When the lubricating oil composition according to the present invention comprises a friction modifier, the content thereof is normally 0.05 to 5 mass % on the basis of the total mass of the lubricating oil composition.

Any known anti-wear agent or extreme-pressure agent may be used as (F) anti-wear agents or extreme-pressure agents, and examples thereof include: metal dithiophosphates (such as Zn salt, Pb salt, Sb salt, and Mo salt), metal dithiocarbamates (such as Zn salt, Pb salt, Sb salt, and Mo salt), naphthenic acid metal salts (such as Pb salt), fatty acid metal salts (such as Pb salt), boron compounds, phosphate esters, phosphite esters, alkyl hydrogenphosphites, phosphate ester amine salts, phosphate ester metal salts (such as Zn salt), disulfides, sulfurized fat, sulfurized olefins, dialkyl polysulfides, diarylalkyl polysulfides, and diaryl polysulfides.

When the lubricating oil composition according to the present invention comprises an anti-wear agent or extreme-pressure agent, the content thereof is normally 0.05 to 5 mass % on the basis of the total mass of the lubricating oil composition.

Any known metallic detergent may be used as (G) metallic detergents, and examples thereof include alkali metal and alkaline earth metal sulfonates, alkali metal and alkaline earth metal phenates, alkali metal and alkaline earth metal salicylates, and combinations thereof. These metallic detergents may be overbased. In the present description, "alkaline earth metal" shall encompass Mg.

When the lubricating oil composition according to the present invention comprises a metallic detergent, the content thereof is not specifically restricted. When the composition is for automobile transmissions, this content is normally 0.005 to 1.0 mass % in terms of metal elements on the basis of the total mass of the lubricating oil composition. When the composition is for internal combustion engines, this content is normally 0.01 to 5.0 mass % in terms of metal elements on the basis of the total mass of the lubricating oil composition. When the composition is for automobile transaxle units, this content is normally 0.001 to 0.1 mass % in terms of metal elements on the basis of the total mass of the lubricating oil composition. In the present description, the content of metal elements in an oil shall be measured by inductively coupled plasma optical emission spectrometry (intensity ratio method (internal standard method)), conforming to JIS K0116.

Any known viscosity index improver or pour point depressant may be used as (H) viscosity index improvers or pour point depressants. Examples of viscosity index improvers include so-called non-dispersant viscosity index improvers such as polymers and copolymers of one or at least two monomers selected from various methacrylates, and hydrogen adducts thereof; so-called dispersant viscosity index improvers that are copolymers of various methacrylates containing nitrogen compounds; non-dispersant or dispersant ethylene-α-olefin copolymers and hydrogen adducts thereof; polyisobutylene and hydrogen adducts thereof; hydrogen adducts of styrene-diene copolymers; styrene-maleic anhydride copolymers; and polyalkylstyrenes. When the lubricating oil composition according to the present invention comprises any viscosity index improver or pour point depressant, the content thereof is normally 0.1 to 20 mass % on the basis of the total mass of the lubricating oil composition.

Examples of pour point depressants include polymethacrylate polymers. When the lubricating oil composition according to the present invention comprises a pour point depressant, the content thereof is normally 0.01 to 2 mass % on the basis of the total mass of the lubricating oil composition.

It is noted that when the (A) first defoaming agent is obtained by polymerizing the defoaming agent monomer (component (b)) in the polymerization solvent under coexistence of the polymer soluble in the polymerization solvent (component (c)), the inventors have found that the component (c) used in polymerization cannot be separated from the first defoaming agent after the polymerization.

Any known corrosion inhibitor such as benzotriazole compounds, tolyltriazole compounds, thiadiazole compounds, and imidazole compounds may be used as (I) corrosion inhibitors. When the lubricating oil composition according to the present invention comprises a corrosion inhibitor, the content thereof is normally 0.005 to 5 mass % on the basis of the total mass of the lubricating oil composition.

Any known anti-rust agent such as petroleum sulfonates, alkylbenzenesulfonates, dinonylnaphthalenesulfonates, alkylsulfonate salts, fatty acids, alkenylsuccinic acid half esters, fatty acid soaps, polyol esters of fatty acids, aliphatic amines, oxidized paraffins, and alkyl polyoxyethylene ethers may be used as (J) anti-rust agents. When the lubricating oil composition according to the present invention comprises an anti-rust agent, the content thereof is normally 0.005 to 5 mass % on the basis of the total mass of the lubricating oil composition.

Any known metal deactivator such as imidazoline, pyrimidine derivatives, alkylthiadiazoles, mercaptobenzothiazole, benzotriazole and derivatives thereof, 1,3,4-thiadiazole polysulfides, 1,3,4-thiadiazolyl-2,5-bis(dialkyldithiocarbamate), 2-(alkyldithio)benzimidazoles, and β-(o-carboxybenzylthio)propionitrile may be used as (K) metal deactivators. When the lubricating oil composition according to the present invention comprises any of these metal deactivators, the content thereof is normally 0.005 to 1 mass % on the basis of the total mass of the lubricating oil composition.

Any known demulsifier such as polyalkylene glycol-based nonionic surfactants may be used as (L) demulsifiers. When the lubricating oil composition according to the present invention comprises a demulsifier, the content thereof is normally 0.005 to 5 mass % on the basis of the total mass of the lubricating oil composition.

Any known defoaming agent such as fluoroalkyl ethers may be used as (M) defoaming agents other than the first or second defoaming agent. When the lubricating oil composition according to the present invention comprises any of these defoaming agents, the content thereof is normally 0.0001 to 0.1 mass % on the basis of the total mass of the lubricating oil composition.

Any known coloring agent such as azo compounds may be used as (N) coloring agents.

(1.6 Production)

The lubricating oil composition according to the present invention may be produced by adding the (A) first defoaming agent and the (B) second defoaming agent to the lubricant base oil, or a composition comprising the lubricant base oil and at least one additive (hereinafter may be referred to as "base oil etc."). Other additives may be further added after addition of the (A) first defoaming agent and the (B) second defoaming agent.

An order of adding the (A) first defoaming agent and the (B) second defoaming agent is not specifically limited. One may add the (B) second defoaming agent after adding the (A) first defoaming agent. One may add the (A) first defoaming agent after adding the (B) second defoaming agent. One may add the (A) first defoaming agent and the (B) second defoaming agent at the same time. Preferably, the (B) second defoaming agent is added after the (A) first defoaming agent is added.

A method for adding the (A) first defoaming agent and the (B) second defoaming agent to the base oil etc. is not specifically limited. For example, (α) one may simply add the defoaming agents to the base oil etc. and make the defoaming agents dispersed; or (β) one may once dissolve or finely disperse the defoaming agents in a diluting solvent (such as kerosene), to prepare a dilution, and thereafter add the dilution to the base oil etc.

When (α) simply adding the defoaming agents to the base oil etc. and making the defoaming agents dispersed, (α1) one may simply add the defoaming agents to the base oil etc., and stir the resultant mixture; or (α2) one may take out part of the base oil etc., add a proper amount of the defoaming agents to the taken base oil etc., stir the resultant mixture (for example, by a mixer), to make the defoaming agents finely dispersed, and add the obtained fine dispersion to the original base oil etc., and stir the resultant mixture.

In the method (α2), the amount of the defoaming agents that are added to the part of the taken base oil etc. is preferably no more than 5 mass % and more preferably no more than 1 mass % on the basis of the total mass of the part of the taken base oil etc. and the added defoaming agents (100 mass %).

When (β) once dissolving or finely dispersing the defoaming agents in a diluting solvent, to prepare a dilution, and thereafter adding the dilution to the base oil etc., (β1) one may separately prepare a dilution of the first defoaming agent, and a dilution of the second defoaming agent, and add them to the base oil etc.; or (β2) one may prepare a mixed dilution (defoaming agent composition) of the first and second defoaming agents, and add the mixed dilution to the base oil etc. The method (β2) is preferable as described later as the method for defoaming a lubricating oil according to the present invention.

(1.7 Lubricating Oil Composition)

The lubricating oil composition according to the present invention, owing to improved storage stability of the defoaming agent, can suppress segregation and precipitation of the defoaming agent even during long-term storage, and thereby suppress deterioration of the defoaming effect. The lubricating oil composition according to the present invention can maintain good deforming effect for a long term even under such lubricating conditions that a lubricating oil is subjected to high centrifugal effect and high shear stress. As a result, foaming of the lubricating oil can be suppressed for a long term, which can also suppress promoted deterioration of the lubricating oil, failure to control hydraulic pressure, wear and seizure, etc. induced by foaming, for a long term.

The kinematic viscosity of the lubricating oil composition according to the present invention is not particularly limited. In one embodiment, the kinematic viscosity of the lubricating oil composition at 100° C. may be 2 to 20 mm$^2$/s. The lubricating oil composition according to the present invention comprises both the (A) first defoaming agent and the (B) second defoaming agent, which leads to suppression of segregation and precipitation of the defoaming agent even during long-term storage to suppress deterioration of the defoaming effect, and which makes it possible to maintain good deforming effect for a long term even under such lubricating conditions that a lubricating oil is subjected to high centrifugal effect and high shear stress, even if the composition has such a low viscosity as to make it easy to segregate the defoaming agent, for example, a kinematic viscosity at 100° C. of no more than 10 mm$^2$/s or no more than 4.5 mm$^2$/s.

(1.8 Use)

The lubricating oil composition according to the present invention may be widely used for the purpose of lubrication that demands defoaming effect especially in view of the above described functions and effects. For example, the lubricating oil composition according to the present invention may be preferably used as internal combustion engine oil, hydraulic oil, industrial gear oil, turbine oil, compressor oil, transmission oil, and automobile axle unit oil, and among them, especially preferably used as automobile engine oil, automobile transmission oil, or automobile axle unit oil.

2. Defoaming Agent Composition, and Method for Defoaming Lubricating Oil>

The method for defoaming a lubricating oil according to the present invention comprises: (i) dissolving or finely dispersing the (A) first defoaming agent and the (B) second defoaming agent into a diluting solvent, to obtain a dilution (defoaming agent composition); and (ii) adding the dilution obtained in the step (i) into a lubricating oil.

(Step (i))

The step (i) is a step of dissolving or finely dispersing the (A) first defoaming agent and the (B) second defoaming agent into a diluting solvent, to obtain a dilution (defoaming agent composition). The (A) first defoaming agent and the (B) second defoaming agent have been described in detail already. Any solvent that can dissolve or finely disperse the first and second defoaming agents may be used as the diluting solvent. The diluting solvent is preferably a solvent soluble in the lubricating oil to which the dilution is added in the step (ii). Preferred examples of the diluting solvent include solvents comprising at least one selected from: hydrocarbon solvents having at least 6 carbons, mineral oils, synthetic oils, ester oils, aliphatic ethers having at least 4 carbons, esters of an aliphatic monocarboxylic acid having at least 2 carbons and a monoalcohol having 1 to 5 carbons, aliphatic ketones having at least 3 carbons, aliphatic alcohols having at least 4 carbons, and halogenated hydrocarbons. One solvent may be used alone, and at least two solvents may be used in combination, as the diluting solvent.

Preferred examples of hydrocarbon solvents having at least 6 carbons include: benzene, toluene, xylene, cyclohexane, n-hexane, n-heptane, n-decane, octane, and methylcyclohexane. This carbon number is preferably 6 to 16, more preferably 6 to 13, and further preferably 6 to 10. Among them, benzene, toluene, xylene, cyclohexane, n-hexane, and n-heptane may be especially preferably used.

Preferred examples of mineral oils, synthetic oils, and ester oils include lamp oil, solvent naphtha, industrial gasoline, mineral spirit, and kerosene, in addition to the mineral base oils, synthetic base oils, and ester base oils described above concerning the lubricant base oil.

Preferred examples of aliphatic ethers having at least 4 carbons include: diethyl ether, diisopropyl ether, tert-butyl methyl ether, dihexyl ether, dimethyl cellosolve, and dioxane. This carbon number is preferably 4 to 12. Among them, diethyl ether, diisopropyl ether, and dihexyl ether may be especially preferably used.

Preferred examples of esters of an aliphatic monocarboxylic acid having at least 2 carbons and a monoalcohol having 1 to 5 carbons include: ethyl acetate, isopropyl acetate, butyl acetate, isobutyl acetate, amyl acetate, isopropyl laurate, isopropyl palmitate, and isopropyl myristate. The carbon number of an aliphatic monocarboxylic acid residue is preferably 2 to 16. The carbon number of an alcohol residue is preferably 2 to 5. Among them, ethyl acetate, butyl acetate, isopropyl laurate, isopropyl palmitate, and isopropyl myristate may be especially preferably used.

Preferred examples of aliphatic ketones having at least 3 carbons include: methyl ethyl ketone, methyl isobutyl ketone, and acetone. This carbon number is preferably 3 to 10. Among them, methyl ethyl ketone and methyl isobutyl ketone may be especially preferably used.

Preferred examples of aliphatic alcohols having at least 4 carbons include: lauryl alcohol, butanol, and 2-ethylhexanol. This carbon number is preferably 4 to 18. Among them, lauryl alcohol may be especially preferably used.

Preferred examples of halogenated hydrocarbons include: carbon tetrachloride, chloroform, fluorothene (1,1,1-trifluoroethane), perchloroethylene, trichloroethylene, tetrachloroethane, dichloromethane, ethylene dichloride, chlorobenzene, chlorofluoromethanes (the substitution numbers of chlorine atom(s) and fluorine atom(s) may be any of at least 1 respectively, as long as the total number thereof is no more than 4), chlorofluoroethanes (the substitution numbers of chlorine atom(s) and fluorine atom(s) may be any of at least 1 respectively, as long as the total number thereof is no more than 6, and the chlorine atom(s) and the fluorine atom(s) may be in any position). The carbon number is preferably no less than 1, and preferably 1 to 6.

When the first and second defoaming agents are dissolved or finely dispersed in the diluting solvent in the dilution (defoaming agent composition), phase segregation or precipitation does not occur in the dilution for a week or more, preferably a month or more, even when the dilution is left standing at 25° C. If at least one of the first and second defoaming agents is not dissolved or finely dispersed in the diluting solvent in the dilution, phase segregation or precipitation occurs within a shorter period (for example, 3 days). Thus, it is possible to determine whether or not the first and second defoaming agents are dissolved or finely dispersed in the diluting solvent, by whether or not phase segregation or precipitation does not occur for a week or more when the dilution is left standing at 25° C. That is, if phase segregation or precipitation does not occur for a week or more when the dilution is left standing at 25° C., it can be determined that the first and second defoaming agents are dissolved or finely dispersed in the diluting solvent.

The total concentration of the first defoaming agent and the second defoaming agent in the dilution (defoaming agent composition) is 100 to 50,000 mass ppm, preferably 100 to 40,000 mass ppm, and more preferably 100 to 30,000 mass ppm in terms of silicon on the basis of the total mass of the diluent. This total concentration at the foregoing lower limit or over can suppress decrease of the flash point of the lubricating oil induced by the dilution. This total concentration at the foregoing upper limit or below can further suppress precipitation of the defoaming agents, to improve the lifetime of the defoaming agents.

(Step (ii))

The step (ii) is adding the dilution (defoaming agent composition) obtained in the step (i) into the lubricating oil. The amount of the dilution to be added to the lubricating oil may be such that the above described preferred concentrations of the defoaming agents in the lubricating oil composition according to the present invention is realized.

The lubricating oil to which the dilution (defoaming agent composition) is added in the step (ii) may already contain additives other than the first or second defoaming agent, in addition to the base oil. One may also add the dilution to the lubricating oil consisting of the base oil and not comprising additives other than the first or second defoaming agent in the step (ii), and thereafter add other additives.

When adding the dilution (defoaming agent composition) to the lubricating oil, one may add the dilution to the lubricating oil little by little successively (for example, dropwise) while mixing, or one may add a desired amount of the dilution to the lubricating oil in one portion. In view of finer dispersion of the defoaming agent in the lubricating oil composition, it is preferable to successively add the dilution to the lubricating oil while mixing.

The method for defoaming a lubricating oil according to the present invention is capable of more effectively suppressing deterioration of the defoaming effect due to segregation and precipitation, and shearing of the defoaming agents, compared to the case of separately adding the first defoaming agent and the second defoaming agent to the lubricating oil.

EXAMPLES

Hereinafter the present invention will be further specifically described based on examples and comparative

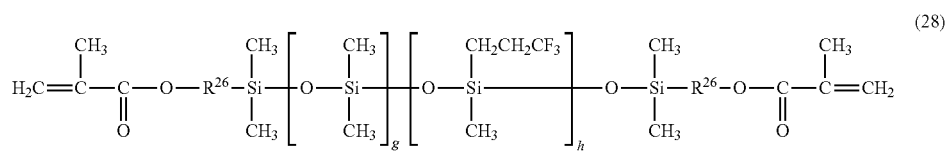

examples. The following examples are intended to show examples of the present invention, but not intended to limit the present invention.

Preparation Examples (Measurement of Molecular Weight and Molecular Weight Distribution)

In the following preparation examples and examples, molecular weights and molecular weight distributions were measured using a GPC system (HLC-8220 manufactured by Tosoh Corporation) equipped with three columns (TSKgel Super Multipore HZ-M; 4.6 mm in internal diameter×15 cm, manufactured by Tosoh Corporation) connected in series, tetrahydrofuran as a mobile phase, a differential refractometer (RI) as a detector, and polystyrene as a standard material, under conditions of measurement temperature: 40° C., flow rate: 0.35 mL/min, sample concentration: 1 mass %, and sample injection volume: 5 μL.

Preparation Example 1

A first defoaming agent A-1 was prepared by the following procedures.

To a 500 mL four-necked flask equipped with a stirrer wing made from polytetrafluoroethylene (with vacuum sealing), a Dimroth condenser, a three-way valve for nitrogen introduction, and a sample inlet, 200 parts by mass of methyl isobutyl ketone (polymerization solvent), 5 parts by mass of polysiloxane macromonomer represented by the following general formula (28) (from Shin-Etsu Chemical Co., Ltd.; weight average molecular weight: 43,000; polydispersity index (Mw/Mn): 1.50), and 95 parts by mass of lauryl methacrylate were introduced and stirred to be a uniform mixture, and thereafter the reaction system was vacuum-degassed and purged with nitrogen five times using a diaphragm pump. Under a nitrogen flow, 0.5 parts by mass of MAIB (dimethyl 2,2'-azobisisobutyrate: azo radical polymerization initiator; from Wako Pure Chemical Industries, Ltd.) as a radical polymerization initiator was introduced from the sample inlet, and the resultant mixture was stirred for 8 hours at the polymerization temperature of 70° C. under a nitrogen atmosphere to conduct a polymerization reaction, to afford a solution of the defoaming agent A-1. The weight average molecular weight (Mw) of the obtained defoaming agent A-1 was 120,000, and the polydispersity index (Mw/Mn) thereof was 3.08.

In the formula (28), $R^{26}$ is a propylene group; and the average fluorination ratio of the polysiloxane structure is 0.5.

Preparation Example 2

A first defoaming agent A-2 was prepared by the following procedures.

To a 500 mL four-necked flask equipped with a stirrer wing made from polytetrafluoroethylene (with vacuum sealing), a Dimroth condenser, a three-way valve for nitrogen introduction, and a sample inlet, 200 parts by mass of methyl isobutyl ketone (polymerization solvent), 30 parts by mass of polysiloxane macromonomer represented by the following general formula (28) (from Shin-Etsu Chemical Co., Ltd.; weight average molecular weight: 43,000; polydispersity index (Mw/Mn): 1.50), and 70 parts by mass of lauryl methacrylate were introduced and stirred to be a uniform mixture, and thereafter the reaction system was vacuum-degassed and purged with nitrogen five times using a diaphragm pump. Under a nitrogen flow, 1.5 parts by mass of MAIB (dimethyl 2,2'-azobisisobutyrate: azo radical polymerization initiator; from Wako Pure Chemical Industries, Ltd.) as a radical polymerization initiator was introduced from the sample inlet, and the resultant mixture was stirred for 8 hours at the polymerization temperature of 70° C. under a nitrogen atmosphere to conduct a polymerization reaction, to afford a solution of the defoaming agent A-2. The weight average molecular weight (Mw) of the obtained defoaming agent A-2 was 213,000, and the polydispersity index (Mw/Mn) thereof was 5.05.

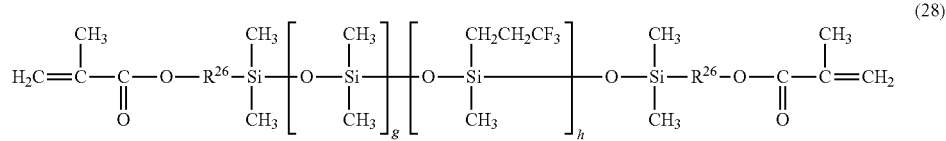

In the formula (28), $R^{26}$ is a propylene group; and the average fluorination ratio of the polysiloxane structure is 0.5.

Preparation Example 3

A first defoaming agent A-3 was prepared by the following procedures.

To a 500 mL four-necked flask equipped with a stirrer wing made from polytetrafluoroethylene (with vacuum sealing), a Dimroth condenser, a three-way valve for nitrogen introduction, and a sample inlet, 200 parts by mass of methyl isobutyl ketone (polymerization solvent), 50 parts by mass of polysiloxane macromonomer represented by the following general formula (28) (from Shin-Etsu Chemical Co., Ltd.; weight average molecular weight: 78,000; polydispersity index (Mw/Mn): 1.62), 50 parts by mass of lauryl methacrylate, and 0.05 parts by mass of dodecyl mercaptan as a chain transfer agent were introduced and stirred to be a uniform mixture, and thereafter the reaction system was vacuum-degassed and purged with nitrogen five times using a diaphragm pump. Under a nitrogen flow, 0.5 parts by mass of MAIB (dimethyl 2,2'-azobisisobutyrate: azo radical polymerization initiator; from Wako Pure Chemical Industries, Ltd.) as a radical polymerization initiator was introduced from the sample inlet, and the resultant mixture was stirred for 8 hours at the polymerization temperature of 70° C. under a nitrogen atmosphere to conduct a polymerization reaction, to afford a solution of the defoaming agent A-3. The weight average molecular weight (Mw) of the obtained defoaming agent A-3 was 177,000, and the polydispersity index (Mw/Mn) thereof was 5.41.

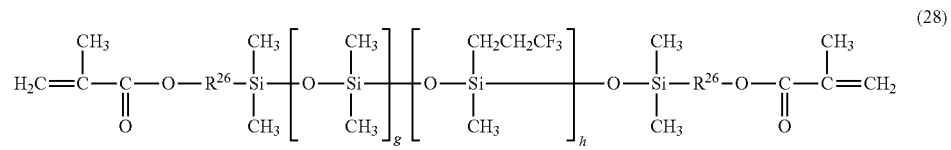

(28)

In the formula (28), $R^{26}$ is a propylene group; and the average fluorination ratio of the polysiloxane structure is 0.5.

Preparation Example 4

A first defoaming agent A-4 was prepared by the following procedures.

To a 500 mL four-necked flask equipped with a stirrer wing made from polytetrafluoroethylene (with vacuum sealing), a Dimroth condenser, a three-way valve for nitrogen introduction, and a sample inlet, 200 parts by mass of methyl isobutyl ketone (polymerization solvent), 5 parts by mass of a polysiloxane macromonomer represented by the following general formula (28) (from Shin-Etsu Chemical Co., Ltd.; weight average molecular weight: 78,000; polydispersity index (Mw/Mn): 1.62), and 95 parts by mass of lauryl methacrylate were introduced and stirred to be a uniform mixture, and thereafter the reaction system was vacuum-degassed and purged with nitrogen five times using a diaphragm pump. Under a nitrogen flow, 0.5 parts by mass of MAIB (dimethyl 2,2'-azobisisobutyrate: azo radical polymerization initiator; from Wako Pure Chemical Industries, Ltd.) as a radical polymerization initiator was introduced from the sample inlet, and the resultant mixture was stirred for 8 hours at the polymerization temperature of 70° C. under a nitrogen atmosphere to conduct a polymerization reaction, to afford a solution of the defoaming agent A-4. The weight average molecular weight (Mw) of the obtained defoaming agent A-4 was 140,000, and the polydispersity index (Mw/Mn) thereof was 2.80.

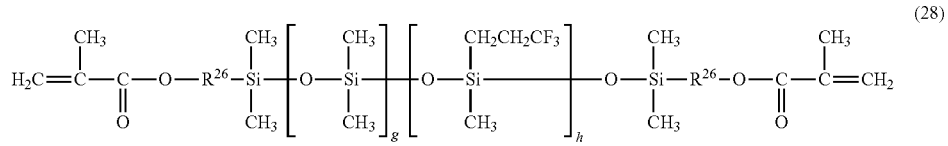

(28)

In the formula (28), $R^{26}$ is a propylene group; and the average fluorination ratio of the polysiloxane structure is 0.5.

Preparation Example 5

A defoaming agent A-5 that did not fall under the first defoaming agent or the second defoaming agent was prepared by the following procedures.

To a 100 ml four-necked flask equipped with a stirrer wing made from polytetrafluoroethylene (with vacuum sealing), a Dimroth condenser, a three-way valve for nitrogen introduction, and a sample inlet, 30 parts by mass of a mineral oil (kinematic viscosity at 40° C.: 8.9 mm²/s) as a polymerization solvent, 3 parts by mass of KF2012 (methacrylate-modified polydimethylsiloxane; from Shin-Etsu Chemical Co., Ltd.; functional group equivalent 4,600 g/mol) and 0.15 parts by mass of ethylene glycol dimethacrylate as defoaming agent monomers, and 1.5 parts by mass of poly(alkyl methacrylate) (weight average molecular weight Mw=320,000) as a polymer dispersant were introduced, and stirred to be a uniform solution, and thereafter the reaction system was vacuum-degassed and purged with nitrogen five times using a diaphragm pump. Under a nitrogen flow, 0.15 parts by mass of PEROCTA O (1,1,3,3-tetramethylbutyl peroxy-2-ethylhexanoate; a peroxide radical polymerization initiator; from NOF CORPORATION) as a radical polymerization initiator was introduced from the sample inlet, and the resultant mixture was stirred for 8 hours at the polymerization temperature of 70° C. under a nitrogen atmosphere to conduct a polymerization reaction, to afford a fine dispersion of a defoaming agent polymer. The average particle size of the obtained defoaming agent polymer was 0.5 μm.

Examples 1 to 9, and Comparative Examples 1 to 13

As shown in Tables 1 to 5, the lubricating oil compositions according to the present invention (examples 1 to 9), and lubricating oil compositions for comparison (comparative examples 1 to 13) were prepared. In Tables 1 to 5, "Si ppm" means mass ppm in terms of silicon on the basis of the total mass of the composition; for the item of "Base oil composition", "mass %" means mass % on the basis of the total mass of the base oils; and for the items of "Total base oil" and "Other additives", "mass %" means mass % on the basis of the total mass of the composition. The details of the components other than the defoaming agents A-1 to A-5 are as follows.

(Base Oils)
O-1: hydrorefined mineral oil (API Group II base oil, kinematic viscosity (100° C.): 2.2 mm²/s, viscosity index: 106)
O-2: hydrorefined mineral oil (API Group III base oil, kinematic viscosity (100° C.): 4.2 mm²/s, viscosity index: 123)
O-3: ester base oil (API Group V base oil, kinematic viscosity (100° C.): 2.7 mm²/s, viscosity index: 178)
(Defoaming Agents)
B-1: fluorosilicone defoaming agent (FA-600 from Shin-Etsu Chemical Co., Ltd.; $R^{24}$: —$CH_2CH_2CF_3$, and $R^{22}$=$R^{23}$=$R^{25}$: —$CH_3$ in the general formula (27); average fluorination ratio of the polysiloxane structure: 0.5; weight average molecular weight: 31,000; average polymerization degree: 153.6)
B-2: fluorosilicone defoaming agent (FA-630 from Shin-Etsu Chemical Co., Ltd.; $R^{24}$: —$CH_2CH_2CF_3$, and $R^{25}$: —$CH_3$ in the general formula (27); average fluorination ratio of the polysiloxane structure: 1.0; weight average molecular weight: 42,000; average polymerization degree: 158.7)
B-3: dimethyl silicone defoaming agent (KF-96 from Shin-Etsu Chemical Co., Ltd., viscosity: 1,000,000 mm²/s, weight average molecular weight: 258,000, average polymerization degree: 2051.2)
(Other Additives)
V-1: polymethacrylate viscosity index improver, weight average molecular weight: 20,000
P-1: additive package (comprising a boric acid-modified succinimide ashless dispersant, a phosphorus-containing anti-wear agent, a Ca sulfonate detergent, an ashless friction modifier, an antioxidant, and a metal deactivator)

TABLE 1

|  |  | Examples | | | | |
| --- | --- | --- | --- | --- | --- | --- |
|  |  | 1 | 2 | 3 | 4 | 5 |
| Base oil composition | | | | | | |
| O-1 | mass % | 80 | 80 | 90 | 80 | 80 |
| O-2 | mass % | 20 | 20 | — | 20 | 20 |
| O-3 | mass % | — | — | 10 | — | — |
| Total | mass % | 100 | 100 | 100 | 100 | 100 |
| Total base oil | mass % | >99 | 90 | 90 | 90 | 90 |
| Defoaming agent | | | | | | |
| A-1 | Si ppm | 10 | 10 | 10 | — | — |
| A-2 | Si ppm | — | — | — | 10 | — |
| A-3 | Si ppm | — | — | — | — | 10 |
| A-4 | Si ppm | — | — | — | — | — |
| A-5* | Si ppm | — | — | — | — | — |
| B-1 | Si ppm | 10 | 10 | 10 | 10 | 10 |
| B-2 | Si ppm | — | — | — | — | — |
| B-3 | Si ppm | — | — | — | — | — |
| Other additives | | | | | | |
| V-1 | mass % | — | — | — | — | — |
| P-1 | mass % | — | 10 | 10 | 10 | 10 |
| Kinematic viscosity | | | | | | |
| 40° C. | mm²/s | 8.9 | 12.4 | 10.6 | 12.4 | 12.4 |
| 100° C. | mm²/s | 2.5 | 3.4 | 2.8 | 3.4 | 3.4 |
| Fresh oil | | | | | | |
| Foam volume in homogenizer test | mL | 40 | 40 | 40 | 40 | 40 |
| Silicon content in oil | ppm | 20 | 20 | 20 | 20 | 20 |
| Supernatant after shearing & centrifugation | | | | | | |
| Foam volume in homogenizer test | mL | 40 | 40 | 40 | 40 | 40 |
| Silicon content in oil | ppm | 14 | 15 | 15 | 15 | 14 |

TABLE 2

|  |  | Examples | | | |
| --- | --- | --- | --- | --- | --- |
|  |  | 6 | 7 | 8 | 9 |
| Base oil composition | | | | | |
| O-1 | mass % | 80 | 80 | 80 | 80 |
| O-2 | mass % | 20 | 20 | 20 | 20 |
| O-3 | mass % | — | — | — | — |
| Total | mass % | 100 | 100 | 100 | 100 |
| Total base oil | mass % | 90 | 90 | 83 | 83 |

TABLE 2-continued

|  |  | Examples | | | |
|---|---|---|---|---|---|
|  |  | 6 | 7 | 8 | 9 |
| Defoaming agent | | | | | |
| A-1 | Si ppm | — | 10 | 10 | 10 |
| A-2 | Si ppm | — | — | — | — |
| A-3 | Si ppm | — | — | — | — |
| A-4 | Si ppm | 10 | — | — | — |
| A-5* | Si ppm | — | — | — | — |
| B-1 | Si ppm | 10 | — | 10 | — |
| B-2 | Si ppm | — | 10 | — | — |
| B-3 | Si ppm | — | — | — | 10 |
| Other additives | | | | | |
| V-1 | mass % | — | — | 7 | 7 |
| P-1 | mass % | 10 | 10 | 10 | 10 |

TABLE 2-continued

|  |  | Examples | | | |
|---|---|---|---|---|---|
|  |  | 6 | 7 | 8 | 9 |
| Kinematic viscosity | | | | | |
| 40° C. | mm$^2$/s | 12.4 | 12.4 | 19.1 | 19.1 |
| 100° C. | mm$^2$/s | 3.4 | 3.4 | 4.5 | 4.5 |
| Fresh oil | | | | | |
| Foam volume in homogenizer test | mL | 40 | 40 | 40 | 40 |
| Silicon content in oil | ppm | 20 | 20 | 20 | 20 |
| Supernatant after shearing & centrifugation | | | | | |
| Foam volume in homogenizer test | mL | 40 | 40 | 40 | 50 |
| Silicon content in oil | ppm | 14 | 12 | 16 | 12 |

TABLE 3

|  |  | Comparative examples | | | | |
|---|---|---|---|---|---|---|
|  |  | 1 | 2 | 3 | 4 | 5 |
| Base oil composition | | | | | | |
| O-1 | mass % | 80 | 80 | 80 | 80 | 80 |
| O-2 | mass % | 20 | 20 | 20 | 20 | 20 |
| O-3 | mass % | — | — | — | — | — |
| Total | mass % | 100 | 100 | 100 | 100 | 100 |
| Total base oil | mass % | >99 | >99 | 90 | 90 | 90 |
| Defoaming agent | | | | | | |
| A-1 | Si ppm | 20 | — | 20 | — | — |
| A-2 | Si ppm | — | — | — | 20 | — |
| A-3 | Si ppm | — | — | — | — | 20 |
| A-4 | Si ppm | — | — | — | — | — |
| A-5* | Si ppm | — | — | — | — | — |
| B-1 | Si ppm | — | 20 | — | — | — |
| B-2 | Si ppm | — | — | — | — | — |
| B-3 | Si ppm | — | — | — | — | — |
| Other additives | | | | | | |
| V-1 | mass % | — | — | — | — | — |
| P-1 | mass % | — | — | 10 | 10 | 10 |
| Kinematic viscosity | | | | | | |
| 40° C. | mm$^2$/s | 8.9 | 8.9 | 12.4 | 12.4 | 12.4 |
| 100° C. | mm$^2$/s | 2.5 | 2.5 | 3.4 | 3.4 | 3.4 |
| Fresh oil | | | | | | |
| Foam volume in homogenizer test | mL | 40 | 40 | 40 | 40 | 40 |
| Silicon content in oil | ppm | 20 | 11 | 20 | 20 | 20 |
| Supernatant after shearing & centrifugation | | | | | | |
| Foam volume in homogenizer test | mL | 80 | 100 | 80 | 70 | 70 |
| Silicon content in oil | ppm | 16 | <1 | 17 | 16 | 14 |

TABLE 4

|  |  | Comparative examples | | | | |
|---|---|---|---|---|---|---|
|  |  | 6 | 7 | 8 | 9 | 10 |
| Base oil composition | | | | | | |
| O-1 | mass % | 80 | 80 | 80 | 80 | 80 |
| O-2 | mass % | 20 | 20 | 20 | 20 | 20 |
| O-3 | mass % | — | — | — | — | — |
| Total | mass % | 100 | 100 | 100 | 100 | 100 |
| Total base oil | mass % | 90 | 90 | 90 | 90 | 90 |

TABLE 4-continued

|  |  | Comparative examples | | | | |
|---|---|---|---|---|---|---|
|  |  | 6 | 7 | 8 | 9 | 10 |
| Defoaming agent |  |  |  |  |  |  |
| A-1 | Si ppm | — | — | — | — | — |
| A-2 | Si ppm | — | — | — | — | — |
| A-3 | Si ppm | — | — | — | — | — |
| A-4 | Si ppm | 20 | — | — | — | — |
| A-5* | Si ppm | — | 10 | 10 | — | — |
| B-1 | Si ppm | — | 10 | 100 | 20 | — |
| B-2 | Si ppm | — | — | — | — | 20 |
| B-3 | Si ppm | — | — | — | — | — |
| Other additives |  |  |  |  |  |  |
| V-1 | mass % | — | — | — | — | — |
| P-1 | mass % | 10 | 10 | 10 | 10 | 10 |
| Kinematic viscosity |  |  |  |  |  |  |
| 40° C. | mm²/s | 19.1 | 12.4 | 12.4 | 12.4 | 12.4 |
| 100° C. | mm²/s | 4.5 | 3.4 | 3.4 | 3.4 | 3.4 |
| Fresh oil |  |  |  |  |  |  |
| Foam volume in homogenizer test | mL | 40 | 40 | 40 | 40 | 40 |
| Silicon content in oil | ppm | 20 | 20 | 110 | 12 | 8 |
| Supernatant after shearing & centrifugation |  |  |  |  |  |  |
| Foam volume in homogenizer test | mL | 80 | 100 | 100 | 100 | 100 |
| Silicon content in oil | ppm | 15 | 4 | 5 | <1 | <1 |

TABLE 5

|  |  | Comparative examples | | |
|---|---|---|---|---|
|  |  | 11 | 12 | 13 |
| Base oil composition |  |  |  |  |
| O-1 | mass % | 80 | 80 | 80 |
| O-2 | mass % | 20 | 20 | 20 |
| O-3 | mass % | — | — | — |
| Total | mass % | 100 | 100 | 100 |
| Total base oil | mass % | 83 | 83 | 83 |
| Defoaming agent |  |  |  |  |
| A-1 | Si ppm | 20 | — | — |
| A-2 | Si ppm | — | — | — |
| A-3 | Si ppm | — | — | — |
| A-4 | Si ppm | — | — | — |
| A-5* | Si ppm | — | — | — |
| B-1 | Si ppm | — | 20 | — |
| B-2 | Si ppm | — | — | — |
| B-3 | Si ppm | — | — | 20 |
| Other additives |  |  |  |  |
| V-1 | mass % | 7 | 7 | 7 |
| P-1 | mass % | 10 | 10 | 10 |
| Kinematic viscosity |  |  |  |  |
| 40° C. | mm²/s | 19.1 | 19.1 | 19.1 |
| 100° C. | mm²/s | 4.5 | 4.5 | 4.5 |
| Fresh oil |  |  |  |  |
| Foam volume in homogenizer test | mL | 40 | 40 | 40 |
| Silicon content in oil | ppm | 20 | 13 | 20 |
| Supernatant after shearing & centrifugation |  |  |  |  |
| Foam volume in homogenizer test | mL | 70 | 100 | 100 |
| Silicon content in oil | ppm | 18 | <1 | <1 |

(Method for Adding Defoaming Agents)

When the lubricating oil compositions of the examples 1 to 9 and comparative examples 1 to 13 were prepared, addition of a plurality of the defoaming agents to each lubricating oil was conducted by the following procedures.

(i) Each defoaming agent was dissolved in a solvent (kerosene or MEK (methyl ethyl ketone)), to prepare a dilution. The total concentration of the defoaming agents in the dilution was 1000 mass ppm in terms of silicon.

(ii) The dilution obtained in the step (i) was added to the lubricating oil dropwise while the resultant mixture was stirred. The amount of the added dilution was such that the defoaming agent concentrations as in Tables 1 to 5 were to be realized.

(Evaluation of Defoaming Effect of Fresh Oil: Homogenizer Test)

Defoaming effect of each of the prepared lubricating oil compositions was evaluated by a homogenizer test machine shown in FIG. 1. The homogenizer test machine shown in FIG. 1 includes a homogenizer 1, a cylindrical heater for heating 2, a temperature adjuster 3, a thermocouple for oil temperature measurement 4, an electric power source for the heater 5, a glass cylinder corresponding to an oil tank 6 (graduated cylindrical glass vessel, 40 mm in inner diameter, 300 mm in depth, 2 mL grading divisions from 0 to 250 mL), and an air blow tube (air blow rate: 30 mL/min) 7.

To the glass cylinder 6, 150 mL of a sample oil was introduced. The temperature of the sample oil was raised by the cylindrical heater for heating 2 to 120° C. The oil surface level at this time was recorded as a reference oil surface level 8. The oil was stirred with the homogenizer 1, and the difference between the oil surface level after 10 minutes stirring and the reference oil surface level was recorded as the amount of foaming. The results are shown in Tables 1 to 5.

(Evaluation of Storage Stability, and Durability Against Centrifugal Effect and Shearing (1): Homogenizer Test)

(a) A Sample Oil Which Has Experienced Shearing by Sonication and Centrifugation was Obtained by Operations of the Following (i) and (ii) on Each of the Prepared Lubricating Oil Compositions.

(i) Shearing by Sonication

Conforming to JASO M347 (test method for shear stability of automatic transmission fluids), 240 mL of a sample oil which has experienced 4 h shearing by sonication was obtained.

(ii) Centrifugation

Four glass centrifuge tubes filled to the 60 mL graduation mark with the sample oil subjected to the shearing by sonication (i) were prepared. These four centrifuge tubes with the sample oil were set in a centrifuge, and rotated at 25° C. at 10,000 rpm for 180 minutes. The relative centrifugal force in this rotation was 8,000 G on average. After the centrifugation, a supernatant (200 mL in total) was recovered.

(b) Homogenizer Test

Defoaming effect of the sample oil recovered after the operations of the (i) and (ii) was evaluated by the homogenizer test same as described above. The results are shown in Tables 1 to 5. Less increase of the amount of foaming after the shearing by sonication and centrifugation means a less tendency to cause segregation and precipitation of the defoaming agent during storage, and means less deterioration of the defoaming effect induced by centrifugal effect and shear effect.

(Evaluation of Storage Stability, and Durability Against Centrifugal Effect and Shearing (2): Measurement of Silicon Content in Oil)

(a) Measurement of Silicon Content in Fresh Oil

The silicon content in the fresh oil of each of the above prepared lubricating oil compositions was measured, by inductively coupled plasma (ICP) atomic emission spectroscopy (intensity ratio method (internal standard method)), conforming to JIS K0116.

(b) Measurement of Silicon Content in Oil After Shearing by Sonication and Centrifugation Concerning the sample oil collected after subjected to the operations of the (i) and (ii), the silicon content in the oil was measured by ICP atomic emission spectroscopy in the same way as described above. The silicon content in the oil after the shearing by sonication and centrifugation closer to that in the fresh oil means a less tendency to cause separation and precipitation of the defoaming agent during storage, and means less loss of the defoaming agent induced by centrifugal effect and shear effect.

All the lubricant oil compositions according to the present invention (examples 1 to 9) showed good defoaming effect not only of the sample oils after the shearing and centrifugation, but also of the fresh oils. In these lubricating oil compositions according to the present invention, sufficient silicon contents in the oils were maintained even after the shearing and centrifugation. In contrast, in the lubricating oil compositions of comparative examples 1 to 13, the sample oils after the shearing and centrifugation showed significantly deteriorated defoaming effect compared to that of the fresh oils. The silicon contents in the oils of the lubricant oil compositions of comparative examples 2, 7 to 10 and 12 to 13 significantly decreased after the shearing and centrifugation.

The above test results show that the lubricating oil composition according to the present invention can suppress deterioration of defoaming performance even during long-term storage, and can maintain deforming effect of lubricating oil for a long term even under such lubricating conditions that the lubricating oil is subjected to high centrifugal and shear effects.

INDUSTRIAL APPLICABILITY

The lubricating oil composition according to the present invention can suppress deterioration of defoaming effect even during long-term storage, and can maintain deforming effect of lubricating oil for a long term even under such lubricating conditions that the lubricating oil is subjected to high centrifugal and shear effects. Thus, the deforming agent and the lubricating oil composition according to the present invention may be preferably employed for any lubricating oil compositions that demands defoaming effect, and among them, may be especially preferably employed in lubricating oil used under such lubricating conditions that the lubricating oil is subjected to centrifugal effect and shear effect, for example, in automobile engine oil, automobile transmission oil, or automobile transaxle oil.

REFERENCE SIGNS LIST 1 homogenizer
2 cylindrical heater for heating
3 temperature adjuster
4 thermocouple for oil temperature measurement
5 electric power source for the heater
6 glass cylinder corresponding to an oil tank (graduated cylindrical glass vessel, 40 mm in inner diameter, 300 mm in depth, 2 mL grading divisions from 0 to 250 mL)
7 air blow tube (air blow rate: 30 mL/min)
8 reference oil surface level

We claim:
1. A lubricating oil composition comprising:
a lubricating base oil;
(A) a first defoaming agent, the first defoaming agent being (A1) a first polymer, or (A2) a second polymer, or any combination thereof; and
(B) a second defoaming agent, the second defoaming agent being a silicone defoaming agent,
the (A1) first polymer comprising:
at least one first polymer chain comprising a polysiloxane structure, the polysiloxane structure having a polymerization degree of 5 to 2000 and being represented by the following general formula (1); and
at least one second polymer chain bonded with the first polymer chain, the second polymer chain comprising a repeating unit represented by the following general formula (2),
the (A2) second polymer being a copolymer of a first monomer component and a second monomer component, the first monomer component being at least one polysiloxane macromonomer selected from compounds represented by the following general formula (7) or (8), the second monomer component being at least one monomer represented by the following general formula (9):

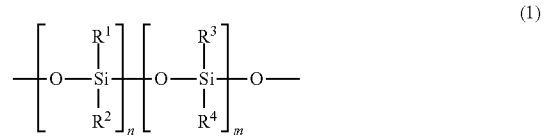

wherein in the general formula (1), polysiloxane repeating units may be in any order; $R^1$ and $R^2$ are each independently a C1-18 organic group comprising no fluorine atom; $R^3$ and $R^4$ are each independently an organic group comprising at least three fluorine atoms, or a C1-18 organic group comprising no fluorine atom, wherein at least one of $R^3$ and $R^4$ is the organic group comprising at least three fluorine atoms; n is an integer of 0 or more; m is an integer of 1 or more; and n+m is 5 to 2000;

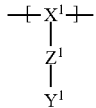 (2)

wherein in the general formula (2), $X^1$ is a repeating unit obtainable by polymerization of an ethylenically unsaturated group; $Y^1$ is a side chain consisting of a substituted or unsubstituted C1-40 hydrocarbyl group; and $Z^1$ is a linking group linking the repeating unit $X^1$ and the side chain $Y^1$;

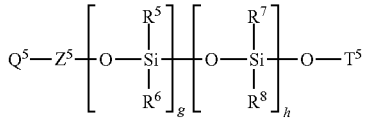 (7)

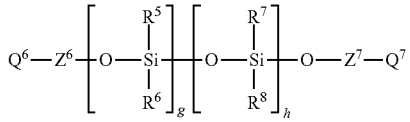 (8)

wherein in the general formulae (7) and (8), polysiloxane repeating units may be in any order; $R^5$ and $R^6$ are each independently a C1-18 organic group comprising no fluorine atom; $R^7$ and $R^8$ are each independently an organic group comprising at least three fluorine atoms, or a C1-18 organic group comprising no fluorine atom, wherein at least one of $R^7$ and $R^8$ is the organic group comprising at least three fluorine atoms; $Q^5$, $Q^6$, and $Q^7$ are each independently a polymerizable functional group comprising an ethylenically unsaturated group; $Z^5$ is a linking group linking the polymerizable functional group $Q^5$ and the polysiloxane moiety; $Z^6$ is a linking group linking the polymerizable functional group $Q^6$ and the polysiloxane moiety; $Z^7$ is a linking group linking the polymerizable functional group $Q^7$ and the polysiloxane moiety; $T^5$ is a non-polymerizable organic group; g is an integer of 0 or more; h is an integer of 1 or more; and g+h is 5 to 2000; and $Q^8$-$Z^8$—$Y^8$ (9)

wherein in the general formula (9), $Q^8$ is a polymerizable functional group comprising an ethylenically unsaturated group; $Y^8$ is a substituted or unsubstituted C1-40 hydrocarbyl group; and $Z^8$ is a linking group linking $Q^8$ and $Y^8$.

2. The lubricating oil composition according to claim 1,
the (A) first defoaming agent comprising the (A1) first polymer,
wherein $X^1$ is a repeating unit obtainable by polymerization of a (meth)acryloyl group.

3. The lubricating oil composition according to claim 1,
the (A) first defoaming agent comprising the (A1) first polymer,
wherein in the (A1) first polymer, the at least one second polymer chain is bonded with one terminal or both terminals of the first polymer chain.

4. The lubricating oil composition according to claim 1,
the (A) first defoaming agent comprising the (A1) first polymer,
wherein the first polymer chain is represented by any one of the following general formulae (3) to (6):

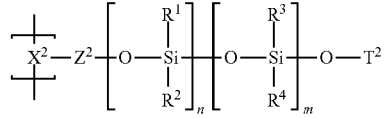 (3)

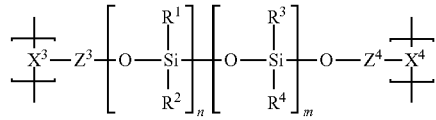 (4)

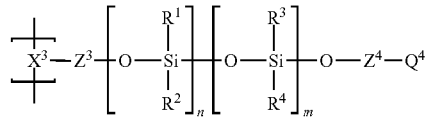 (5)

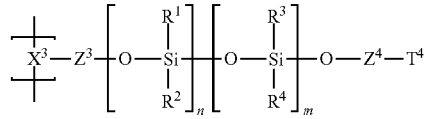 (6)

wherein in the general formulae (3) to (6), polysiloxane repeating units may be in any order; $R^1$, $R^2$, $R^3$, $R^4$, n and m are as previously defined; $X^2$, $X^3$, and $X^4$ are each independently a repeating unit obtainable by polymerization of an ethylenically unsaturated group; $T^2$ is a non-polymerizable organic group; $Q^4$ is a polymerizable functional group giving the repeating unit $X^4$ upon polymerization; $T^4$ is an organic group derived from the polymerizable functional group $Q^4$ by a reaction other than polymer chain elongation; $Z^2$ is a linking group linking the repeating unit $X^2$ and the polysiloxane moiety; $Z^3$ is a linking group linking the repeating unit $X^3$ and the polysiloxane moiety; and $Z^4$ is a linking group linking the repeating unit $X^4$, the polymerizable functional group $Q^4$, or the organic group $T^4$ with the polysiloxane moiety.

5. The lubricating oil composition according to claim 4, wherein $X^2$, $X^3$, and $X^4$ are repeating units obtainable by polymerization of a (meth)acryloyl group.

6. The lubricating oil composition according to claim 1,
the (A) first defoaming agent comprising the (A1) first polymer,
wherein in the (A1) first polymer, the at least one second polymer chain is bonded with only one terminal of the first polymer chain.

7. The lubricating oil composition according to any of claim 1,
the (A) first defoaming agent comprising the (A1) first polymer,
wherein in the (A1) first polymer, the at least one second polymer chain is bonded with both terminals of at least one of the first polymer chain.

8. The lubricating oil composition according to claim 1,
the (A) first defoaming agent comprising the (A1) first polymer,
wherein in the (A1) first polymer, a ratio of a total number of fluorine atom-containing polysiloxane repeating units to a total number of all polysiloxane repeating units is 0.01 to 1.

9. The lubricating oil composition according to claim 1, the (A) first defoaming agent comprising the (A1) first polymer, wherein the (A1) first polymer comprises the first polymer chain in an amount of 0.5 to 80 mass % on the basis of the total mass of the (A1) first polymer.

10. The lubricating oil composition according to claim 1, the (A) first defoaming agent comprising the (A1) first polymer, wherein the (A1) first polymer has a weight average molecular weight of 10,000 to 1,000,000.

11. The lubricating oil composition according to claim 1, the (A) first defoaming agent comprising the (A1) first polymer, wherein the first polymer chain has a weight average molecular weight of 500 to 500,000.

12. The lubricating oil composition according to claim 1, the (A) first defoaming agent comprising the (A2) second polymer, wherein in the first monomer component, a ratio of a total number of fluorine atom-containing polysiloxane repeating units to a total number of all polysiloxane repeating units is 0.01 to 1.

13. The lubricating oil composition according to claim 1, the (A) first defoaming agent comprising the (A2) second polymer, wherein the (A2) second polymer comprises repeating units derived from the first monomer component in an amount of 0.5 to 80 mass % on the basis of the total mass of the (A2) second polymer.

14. The lubricating oil composition according to claim 1, the (A) first defoaming agent comprising the (A2) second polymer, wherein $Q^5$, $Q^6$, and $Q^7$ comprise a (meth)acryloyl group.

15. The lubricating oil composition according to claim 1, the (A) first defoaming agent comprising the (A2) second polymer, wherein the (A2) second polymer has a weight average molecular weight of 10,000 to 1,000,000.

16. The lubricating oil composition according to claim 1, the (A) first defoaming agent comprising the (A2) second polymer, wherein the first monomer component has a weight average molecular weight of 500 to 500,000.

17. The lubricating oil composition according to claim 1, wherein the (B) second defoaming agent is a fluorosilicone defoaming agent.

18. The lubricating oil composition according to claim 1, wherein a ratio (A/B) of an amount of the (A) first defoaming agent in terms of silicon to an amount of the (B) second defoaming agent in terms of silicon is 0.01 to 100.

19. The lubricating oil composition according to claim 1, wherein a total amount of the (A) first defoaming agent and the (B) second defoaming agent is 0.2 to 300 mass ppm in terms of silicon on the basis of the total mass of the composition.

20. The lubricating oil composition according to claim 1, wherein the composition has a kinematic viscosity at 100° C. of no more than 4.5 mm²/s.

21. A method for defoaming a lubricating oil, the method comprising:
(i) dissolving or finely dispersing (A) a first defoaming agent and (B) a second defoaming agent into a diluting solvent, to obtain a dilution such that a total concentration of the (A) first defoaming agent and the (B) second defoaming agent in the dilution is 100 to 50,000 mass ppm in terms of silicon; and
(ii) adding the dilution obtained in the (i) into a lubricating oil,
wherein the (A) first defoaming agent is (A1) a first polymer, or (A2) a second polymer, or any combination thereof;
the (A1) first polymer comprises:
at least one first polymer chain comprising a polysiloxane structure, wherein the polysiloxane structure has a polymerization degree of 5 to 2000 and is represented by the following general formula (1); and
at least one second polymer chain bonded with the first polymer chain, wherein the second polymer chain comprises a repeating unit represented by the following general formula (2);
the (A2) second polymer is a copolymer of a first monomer component and a second monomer component, wherein the first monomer component is at least one polysiloxane macromonomer selected from compounds represented by the following general formula (7) or (8), and wherein the second monomer component is at least one monomer represented by the following general formula (9); and
the (B) second defoaming agent is a silicone defoaming agent:

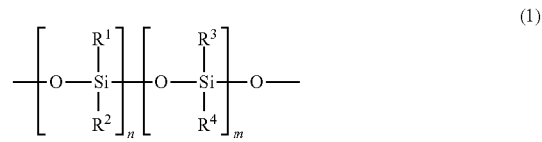

wherein in the general formula (1), polysiloxane repeating units may be in any order; $R^1$ and $R^2$ are each independently a C1-18 organic group comprising no fluorine atom; $R^3$ and $R^4$ are each independently an organic group comprising at least three fluorine atoms, or a C1-18 organic group comprising no fluorine atom, wherein at least one of $R^3$ and $R^4$ is the organic group comprising at least three fluorine atoms; n is an integer of 0 or more; m is an integer of 1 or more; and n+m is 5 to 2000;

wherein in the general formula (2), $X^1$ is a repeating unit obtainable by polymerization of an ethylenically unsaturated group; $Y^1$ is a side chain consisting of a substituted or unsubstituted C1-40 hydrocarbyl group; $Z^1$ is a linking group linking the repeating unit $X^1$ and the side chain $Y^1$;

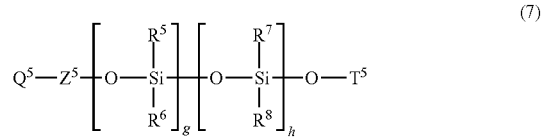

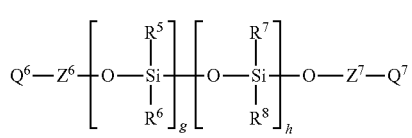

(8)

wherein in the general formulae (7) and (8), polysiloxane repeating units may be in any order; $R^5$ and $R^6$ are each independently a C1-18 organic group comprising no fluorine atom; $R^7$ and $R^8$ are each independently an organic group comprising at least three fluorine atoms, or a C1-18 organic group comprising no fluorine atom, wherein at least one of $R^7$ and $R^8$ is the organic group comprising at least three fluorine atoms; $Q^5$, $Q^6$, and $Q^7$ are each independently a polymerizable functional group comprising an ethylenically unsaturated group; $Z^5$ is a linking group linking the polymerizable functional group $Q^5$ and the polysiloxane moiety; $Z^6$ is a linking group linking the polymerizable functional group $Q^6$ and the polysiloxane moiety; $Z^7$ is a linking group linking the polymerizable functional group $Q^7$ and the polysiloxane moiety; $T^5$ is a non-polymerizable organic group; g is an integer of 0 or more; h is an integer of 1 or more; and g+h is 5 to 2000; and $$Q^8\text{-}Z^8\text{—}Y^8 \qquad (9)$$

wherein in the general formula (9), $Q^8$ is a polymerizable functional group comprising an ethylenically unsaturated group; $Y^8$ is a substituted or unsubstituted C1-40 hydrocarbyl group; and $Z^8$ is a linking group linking $Q^8$ and $Y^8$.

22. The method for defoaming the lubricating oil according to claim 21,
wherein the diluting solvent comprises at least one solvent selected from the group consisting of: hydrocarbon solvents having at least 6 carbons, mineral oils, synthetic oils, ester oils, aliphatic ethers having at least 4 carbons, esters of aliphatic monocarboxylic acids having at least 2 carbons and C1-5 monoalcohols, aliphatic ketones having at least 3 carbons, aliphatic alcohols having at least 4 carbons, and halogenated hydrocarbons.

23. A defoaming agent composition comprising:
(A) a first defoaming agent, the first defoaming agent being (A1) a first polymer, or (A2) a second polymer, or any combination thereof; and
(B) a second defoaming agent being a silicone defoaming agent,
the (A1) first polymer comprising:
at least one first polymer chain comprising a polysiloxane structure, the polysiloxane structure having a polymerization degree of 5 to 2000 and being represented by the following general formula (1); and
at least one second polymer chain bonded with the first polymer chain, the second polymer chain comprising a repeating unit represented by the following general formula (2),
the (A2) second polymer being a copolymer of a first monomer component and a second monomer component, the first monomer component being at least one polysiloxane macromonomer selected from compounds represented by the following general formula (7) or (8), the second monomer component being at least one monomer represented by the following general formula (9):

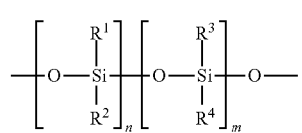

(1)

wherein in the general formula (1), polysiloxane repeating units may be in any order; $R^1$ and $R^2$ are each independently a C1-18 organic group comprising no fluorine atom; $R^3$ and $R^4$ are each independently an organic group comprising at least three fluorine atoms, or a C1-18 organic group comprising no fluorine atom, wherein at least one of $R^3$ and $R^4$ is the organic group comprising at least three fluorine atoms; n is an integer of 0 or more; m is an integer of 1 or more; and n+m is 5 to 2000;

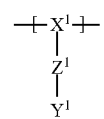

(2)

wherein in the general formula (2), $X^1$ is a repeating unit obtainable by polymerization of an ethylenically unsaturated group; $Y^1$ is a side chain consisting of a substituted or unsubstituted C1-40 hydrocarbyl group; $Z^1$ is a linking group linking the repeating unit $X^1$ and the side chain $Y^1$;

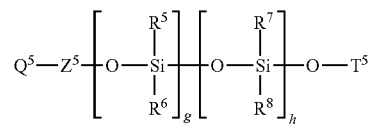

(7)

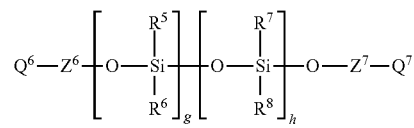

(8)

wherein in the general formulae (7) and (8), polysiloxane repeating units may be in any order; $R^5$ and $R^6$ are each independently a C1-18 organic group comprising no fluorine atom; $R^7$ and $R^8$ are each independently an organic group comprising at least three fluorine atoms, or a C1-18 organic group comprising no fluorine atom, wherein at least one of $R^7$ and $R^8$ is the organic group comprising at least three fluorine atoms; $Q^5$, $Q^6$, and $Q^7$ are each independently a polymerizable functional group comprising an ethylenically unsaturated group; $Z^5$ is a linking group linking the polymerizable functional group $Q^5$ and the polysiloxane moiety; $Z^6$ is a linking group linking the polymerizable functional group $Q^6$ and the polysiloxane moiety; $Z^7$ is a linking group linking the polymerizable functional group $Q^7$ and the polysiloxane moiety; $T^5$ is a non-polymerizable organic group; g is an integer of 1 or more; h is an integer of 1 or more; and g+h is 5 to 2000; and $$Q^8\text{-}Z^8\text{—}Y^8 \qquad (9)$$

wherein in the general formula (9), $Q^8$ is a polymerizable functional group comprising an ethylenically unsaturated group; $Y^8$ is a substituted or unsubstituted C1-40 hydrocarbyl group; and $Z^8$ is a linking group linking $Q^8$ and $Y^8$.

24. The defoaming agent composition according to claim 23, further comprising:
  a diluting solvent comprising at least one solvent selected from the group consisting of: hydrocarbon solvents having at least 6 carbons, mineral oils, synthetic oils, ester oils, aliphatic ethers having at least 4 carbons, esters of aliphatic monocarboxylic acids having at least 2 carbons and C1-5 monoalcohols, aliphatic ketones having at least 3 carbons, aliphatic alcohols having at least 4 carbons, and halogenated hydrocarbons.

* * * * *